(12) United States Patent
Reddiar et al.

(10) Patent No.: US 12,647,642 B2
(45) Date of Patent: Jun. 2, 2026

(54) DYNAMIC PROCESSING AND DISPLAY OF MULTI-STREAM VIDEO CONTENT

(71) Applicant: Intel Corporation, Santa Clara, CA (US)

(72) Inventors: Palanivel Guruva Reddiar, Chandler, AZ (US); Aswin Padmanabhan, San Jose, CA (US); Kiran K. Velicheti, Chandler, AZ (US); Addicam V. Sanjay, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/825,795

(22) Filed: May 26, 2022

(65) Prior Publication Data

US 2022/0286736 A1    Sep. 8, 2022

(51) Int. Cl.
| | |
|---|---|
| *H04N 21/44* | (2011.01) |
| *G06F 3/14* | (2006.01) |
| *H04N 19/107* | (2014.01) |
| *H04N 19/172* | (2014.01) |
| *H04N 21/2187* | (2011.01) |
| *H04N 21/414* | (2011.01) |
| *H04N 21/81* | (2011.01) |

(52) U.S. Cl.
CPC ..... *H04N 21/44004* (2013.01); *G06F 3/1446* (2013.01); *H04N 19/107* (2014.11); *H04N 19/172* (2014.11); *H04N 21/2187* (2013.01); *H04N 21/414* (2013.01); *H04N 21/812* (2013.01)

(58) Field of Classification Search
CPC ...................... H04N 21/812; H04N 21/44004
See application file for complete search history.

(56) References Cited

U.S. PATENT DOCUMENTS

| | | | | |
|---|---|---|---|---|
| 2009/0195255 A1* | 8/2009 | Kalokitis | ........... | G01R 29/0878 |
| | | | | 324/522 |
| 2010/0014594 A1* | 1/2010 | Beheydt | ........... | H04N 21/23424 |
| | | | | 375/240.26 |
| 2010/0075287 A1* | 3/2010 | Dohrmann | ................ | G09B 5/00 |
| | | | | 434/309 |
| 2011/0310301 A1* | 12/2011 | Kim | ....................... | G06T 3/4084 |
| | | | | 348/E5.112 |
| 2020/0169760 A1* | 5/2020 | Wang | .................... | H04N 19/132 |

* cited by examiner

*Primary Examiner* — Michael H Hong
(74) *Attorney, Agent, or Firm* — Alliance IP, LLC

(57) ABSTRACT

In one embodiment, an electronic device includes a video-in interface, a video-out interface, memory circuitry, and processing circuitry. A first video stream with uncompressed frames is received via the video-in interface. The first video stream is compressed and then stored in a video buffer on the memory circuitry. For example, the uncompressed frames are individually compressed and stored in the video buffer. A second video stream with encoded frames is decoded and then played on a display device. For example, the encoded frames are decoded and then displayed on the display device via the video-out interface. The first video stream is then decompressed and played on the display device. For example, the compressed frames in the video buffer are individually decompressed and then displayed on the display device via the video-out interface.

25 Claims, 17 Drawing Sheets

DYNAMIC PROCESSING AND DISPLAY OF MULTI-STREAM VIDEO CONTENT

FIELD OF THE SPECIFICATION

This disclosure relates in general to the field of video processing, and more particularly, though not exclusively, to dynamic processing and display of multi-stream video content.

BACKGROUND

Many digital display use cases, such as digital signage and interactive flat panel displays (IFPDs), blend and/or alternate between multiple sources of video content, such as raw video received over a video-in port and/or encoded video stored locally or streamed over a network. In these use cases, current solutions may rely on manually pausing or switching between different video content. Moreover, when the video-in content is paused, the raw video received over the video-in port may be buffered to allow playback to resume where it left off, which consumes significant memory resources since the raw video is uncompressed.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Many digital display use cases, such as digital signage and interactive flat panel displays (IFPDs), blend and/or alternate between multiple video streams, such a primary stream and one or more secondary streams. In these use cases, the primary stream is typically a raw video stream (e.g., uncompressed/unencoded video) received via a video-in port from an external device (e.g., laptop, personal computer, media player), while the secondary streams are typically encoded video streams that are read from local storage or received remotely over a network.

The current solutions for these use cases are both labor and resource intensive, however, as they often require some level of manual intervention to pause and/or switch between the primary and secondary streams, along with significant memory resources to buffer the primary stream while the secondary stream(s) are being played.

For example, in both digital signage and IFPD use cases, current solutions rely on manually pausing the primary stream in order to switch to the secondary stream(s). Moreover, when the primary stream is paused, the raw video content received via the video-in port may be buffered in memory while the secondary stream(s) are played, which consumes significant memory resources since the buffered video content from the primary stream is neither compressed nor encoded.

Figures 1A, 1B:
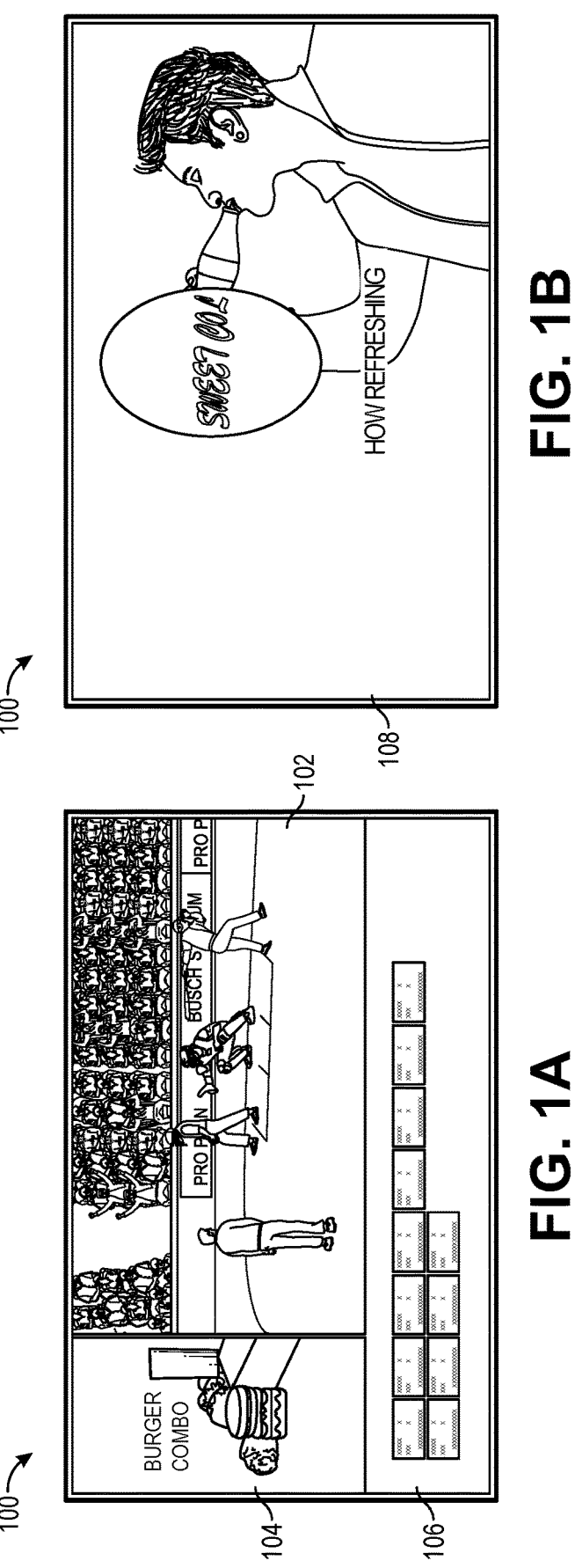
FIGS. 1A-B illustrate an example of a multi-stream digital signage use case.

As an example, a multi-stream digital signage use case 100 is shown in FIGS. 1A-B, where the primary content is a sporting event (e.g., a baseball game), and the secondary content is advertisements. In some embodiments, the sporting event may be received over a video-in port as raw video, while the advertisements may be read from local storage or received over a network as encoded video streams. Moreover, during playback of the sporting event, the advertisements may be displayed using various types of client-side ad insertion. For example, in FIG. 1A, the sporting event 102 is played with advertisements 104, 106 embedded at the bottom and left edges of the frame/screen (e.g., a hamburger ad on the left and sport scores at the bottom), while in FIG. 1B, the sporting event is interrupted to play a full-screen advertisement 108 (e.g., a soft drink ad).

When the sporting event is interrupted to play a full-screen advertisement (e.g., as shown in FIG. 1B), raw video content received over the video-in port may be buffered so that playback of the sporting event can resume where it was interrupted once the advertisement finishes playing. Without any compression, however, the buffer requirements and associated memory bandwidth constraints for buffering the sporting event are extremely high.

Alternatively, the primary content and the advertisements may be "pre-blended" offline—such as by blending them together into a single video stream in advance of playback—and the blended stream may then be played instead of alternating between multiple streams. This process is very labor and resource intensive, however, and it cannot be applied to live video content, such as live sports and classroom scenarios.

Figures 2A, 2B:
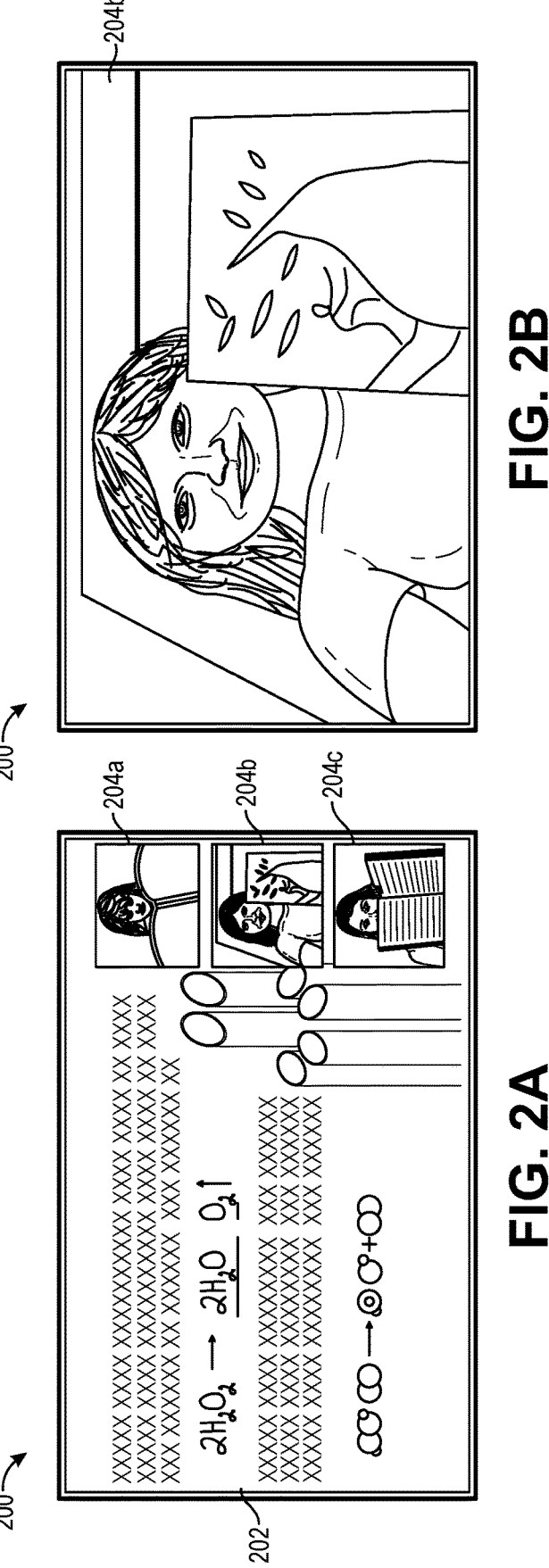
FIGS. 2A-B illustrate an example of a multi-stream interactive display use case.

As another example, a multi-stream IFPD use case 200 is shown in FIGS. 2A-B, where the primary content is a presentation 202 (e.g., educational material presented by a teacher or a business presentation presented by an employee), and the secondary content is live video feeds 204a-c of remote audience members or participants (e.g., students or employees). In some embodiments, the presentation may be received over a video-in port as raw video, while the audience video feeds may be received over a network as encoded video streams. In FIG. 2A, the presentation is displayed with thumbnail videos 204a-c of audience members overlaid on or adjacent to the presentation 202 (e.g., on the right side of the screen), while in FIG. 2B, the presentation is interrupted to display full-screen video 204b of one of the audience members.

In a virtual classroom use case, for example, when a student has a question and/or wants to present certain materials, the student presses a "raise hand" interrupt, and the teacher then manually pauses the primary educational content to allow a full-screen video of the student and/or the student's presentation to temporarily take over the screen.

The current solutions for these use cases have various disadvantages. For example, current solutions are resource intensive, as the buffer requirements and memory bandwidth constraints for storing raw video received over the video-in port are extremely high. These solutions are also labor intensive, as they often require some level of manual intervention to pause and/or switch between primary and secondary content. Moreover, pre-blending of primary and secondary content (e.g., a sporting event and advertisements) is highly labor and resource intensive, as it requires various video processing and editing tasks to be performed manually. Pre-blending is also limited to static content—it cannot be used for dynamic content, such as dynamic ads on digital signage or live video content on a digital display or IFPD (e.g., a live sporting event or live video feeds of students in a virtual classroom).

Accordingly, this disclosure presents a solution for dynamically processing and displaying multiple video streams in a resource-efficient manner. The described solution is particularly beneficial for emerging edge applications on resource-constrained devices, including digital signage and interactive flat panel displays, among other examples.

In some embodiments, for example, the multi-stream scenario described above—dynamically blending or alternating between raw video content (e.g., video-in) and other sources of video content (e.g., encoded video stored locally or streamed remotely)—is implemented in a resource-efficient manner using an inline pixel processing and compression scheme. For example, when video playback switches from a raw video stream (e.g., content received via the video-in port) to an encoded video stream (e.g., an advertisement or live video stream), the raw video stream is compressed and buffered inline while the encoded video stream is being played. Once the encoded video stream finishes playing, playback of the raw video stream may resume at the previous stopping point by decompressing and displaying the compressed frames in the buffer.

In some embodiments, for example, the raw video stream is compressed using an inline pixel processing scheme, which performs lightweight frame-by-frame compression on incoming frames of the raw video stream. For example, each frame may be compressed individually and/or independently of other frames using any suitable type of video/image compression or encoding, such as an intra-frame compression mode of a video codec, an image compression format, and so forth.

The compressed frames of the raw video stream may then be buffered—or temporarily stored in a video buffer in main memory (e.g., DRAM) and/or persistent storage (e.g., hard disk drive (HDD), solid-state drive (SSD))—until they are subsequently played back. In some embodiments, the compressed frames are initially stored in main memory but may eventually be stored in persistent storage if the system is low on memory (e.g., based on a memory utilization threshold). For example, as the quantity or duration of secondary content increases (e.g., the number and/or length of advertisements), the size or volume of primary content in the video buffer also increases, which may eventually lead to low memory.

In some embodiments, for example, an application initially plays primary content received via the video-in port, but the moment the application decides to play secondary content (e.g., an advertisement), the primary video-in stream is sent for inline compression and storage. When the application decides to resume playback of the primary content (e.g., the advertisement finishes playing), the compressed video-in stream is decompressed and displayed.

Moreover, since each frame of the video-in stream is compressed individually/independently (e.g., using intra-frame compression) instead of fully encoding the video-in stream (e.g., using inter-frame encoding and/or motion compensation to encode frames with dependencies on each other), any compressed frame in the stream can be decoded or decompressed on demand without having to first decode any other frame(s) in the stream, which decreases latency when resuming playback of the primary content. As a result, an application can switch between primary content and secondary content on demand with low latency.

In this manner, the described solution enables dynamic switching between video-in content and advertisements in digital signage use cases, and between video-in content (e.g., educational materials, presentations) and live video streams in IFPD use cases, among other examples.

Further, in some embodiments, video analytics is leveraged using artificial intelligence to increase automation, such as automatically switching between primary and secondary content, skipping ahead in certain streams, and so forth.

The described solution has various advantages. For example, this solution enables dynamic switching between video-in streams and other video streams, such as live content and advertisements in digital signage use cases, and teacher content and student video feeds in IFPD use cases. In addition, no manual intervention or other video editing infrastructure is required. This solution also has high market penetrability and lower total cost of ownership (TCO) for users or customers of digital display products.

Figure 3:
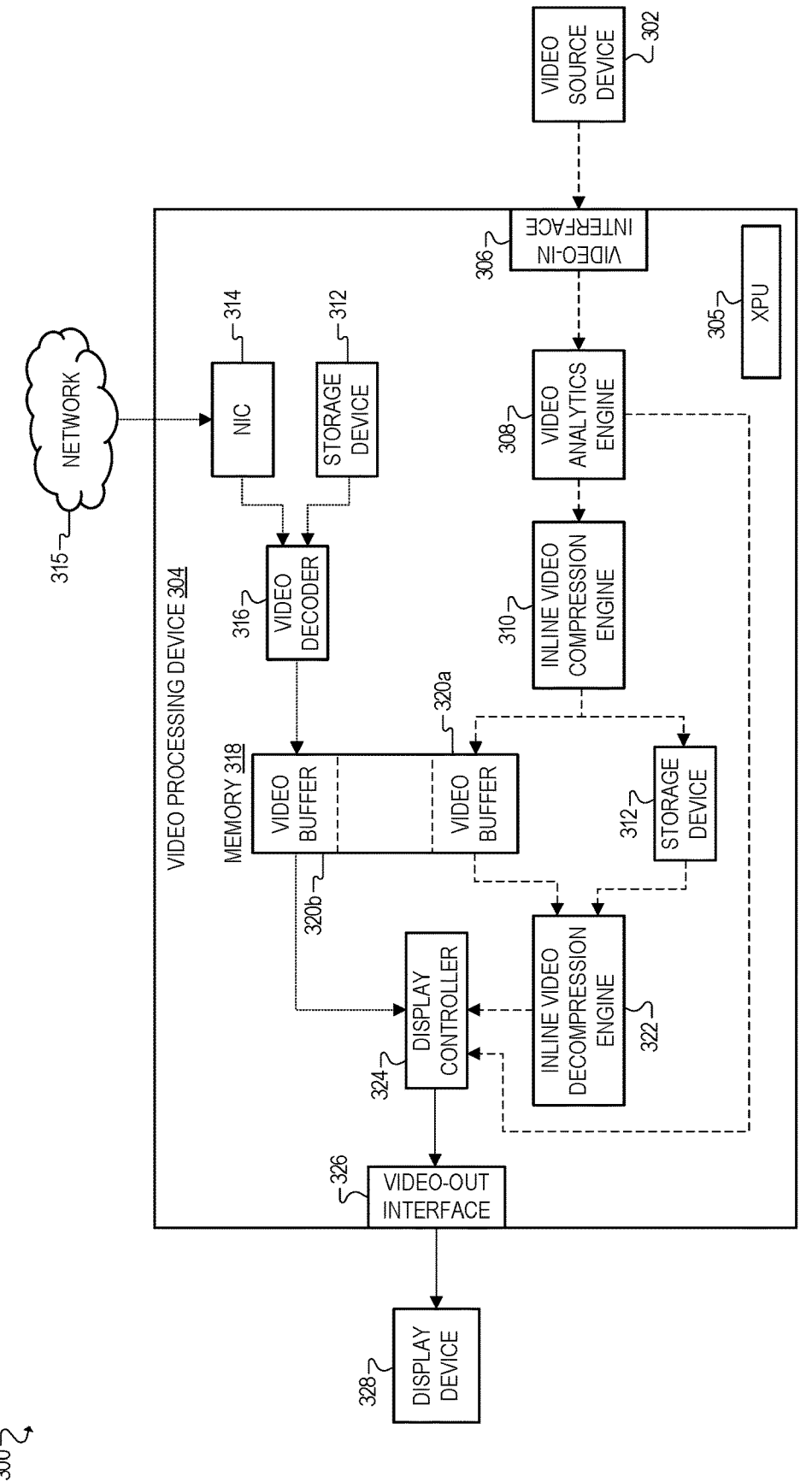
FIG. 3 illustrates an example embodiment of a multi-stream video processing and display system.

FIG. 3 illustrates an example embodiment of a multi-stream video processing and display system 300. In some embodiments, system 300 may be used to implement the digital signage and IFPD use cases of FIGS. 1A-B and FIGS. 2A-B.

In the illustrated embodiment, system 300 includes a video source device 302, a video processing device 304, a display device 328, and a communication network 315. The video processing device 304 is used to dynamically blend and/or alternate playback between multiple video streams or other sources of video content. In the illustrated example, the video streams include a raw video stream received via a video-in interface or port 306—referred to as the "video-in stream"—and an encoded video stream, which may be stored locally or streamed over a network 315, among other possibilities. Moreover, the illustrated example shows the processing pipeline for the video-in stream 301*a* and the encoded video stream 301*b*, along with portions of the pipeline shared by both streams 301*c*.

For example, with respect to the video-in stream 301*a*, the video-in stream 301*a* is received as raw video over a video-in interface 306 from a video source device 302 (e.g., media player, laptop, personal computer).

In some embodiments, the video-in stream 301*a* is then processed through a video analytics engine 308 to analyze the content in the stream. For example, the content in the video-in stream may be used to determine when to interrupt playback and switch to another stream, or when to skip ahead in the video-in stream, among other examples.

If playback of the video-in stream 301*a* is not interrupted, then the raw frames in the video-in stream 301*a* are provided to the display controller 324, which outputs the frames for display on the display device 328 via the video-out interface 326.

However, if playback of the video-in stream 301*a* is interrupted—either manually or automatically (e.g., based on a playback timer, a predetermined breakpoint, and/or content detected by the video analytics engine 308)—then the raw frames in the video-in stream 301*a* are compressed and buffered while another encoded video stream 301*b* is played.

For example, the raw frames in the video-in stream 301*a* are provided to an inline video compression engine 310, which performs inline frame-by-frame compression to compress each incoming frame individually without any dependencies on other frames in the stream (e.g., no inter-frame dependencies). The inline video compression engine 310 may use any type of video/image compression/encoding, such as a video codec with support for intra-frame compression (e.g., H.264 Advance Video Coding (AVC), H.265 High Efficiency Video Coding (HEVC), AOMedia Video 1 (AV1), VP9, MPEG-5 Essential Video Coding (EVC)), or a standard image or file compression format (e.g., PNG, JPEG, 7-zip), among other examples.

The compressed frames output by the inline video compression engine 310 are then buffered—or temporarily stored in a video buffer 320*a*—until playback of the video-in stream 301*a* resumes (e.g., after the encoded video stream 301*b* is finished playing). In some embodiments, the video buffer 320*a* may be in main memory 318 (e.g., DRAM) and/or on a persistent storage device 312 (e.g., hard disk drive (HDD), solid-state drive (SSD), memory card). For example, the compressed frames may initially be buffered in main memory 318 but may eventually be buffered on a local storage device 312 if/when the system is low on memory (e.g., based on a memory utilization threshold).

Meanwhile, while the video-in stream 301*a* is being compressed and buffered, an encoded video stream 301*b* is decoded and played on the display device 328. For example, the encoded video stream 301*b* may be streamed over a network 315 and received via a network interface controller (NIC) 314 of the video processing device 304, or the encoded video stream 301*b* may be stored on—and read from—a local storage device 312 of the video processing device 304, among other examples.

The video decoder 316 then decodes the frames of the encoded video stream 301*b* using a decoding algorithm that matches the type of encoding used to encode the stream. In some embodiments, for example, the encoded video stream may have been compressed/encoded using a video compression/encoding standard or codec, including, but not limited to, H.264 AVC, H.265 HEVC, AV1, VP9, or MPEG-5 Essential Video Coding (EVC), among other examples.

The decoded or raw frames output by the video decoder 316 may then be temporarily buffered in another video buffer 320*b* (e.g., in memory 318) until they are ready to be displayed. For example, each decoded frame may be sequentially read from the video buffer 320*b* and provided to the display controller 324, which outputs each frame for display on the display device 328 via the video-out interface 326.

When the time comes to resume playback of the video-in stream 301*a*—such as when playback of the encoded video stream 301*b* is complete or otherwise interrupted (e.g., interrupted manually or automatically in a similar manner as described above for the video-in stream 301*a*), the compressed video-in stream 301*a* is then decompressed and displayed.

For example, the compressed frames of the video-in stream 301*a* are sequentially read from the video buffer 320*a* (e.g., in memory 318 and/or on the storage device 312) and provided to an inline video decompression engine 322, which performs inline frame-by-frame decompression to sequentially decompress each frame (e.g., using a decompression algorithm that matches the particular compression algorithm used by the inline video compression engine 310).

The decompressed or raw frames output by the inline video decompression engine 322 are then provided to the display controller 324, which outputs each frame for display on the display device 328 via the video-out interface 326.

As an example, an application executing on the video processing device 304 may initially play the video-in stream 301*a* on the display device 328, but the application may subsequently decide to interrupt playback and switch to another video stream 301*b*. As a result, the incoming video-in stream 301*a* is compressed inline and buffered while the other video stream 301*b* is played on the display device 328. When the application decides to resume playback of the video-in stream 301*a* (e.g., after the second stream 301*b* is finished playing), the compressed video-in stream 301*a* is read from the buffer, decompressed, and displayed. In this manner, the video-in content 301*a* is continuously played by the video source device 302 without being paused—and continuously received by the video processing device 304—while the second video stream 301*b* is displayed on the display device 328.

In some embodiments, system 300 may be used to implement the digital signage and IFPD use cases of FIGS. 1A-B and FIGS. 2A-B. In a digital signage use case, for example, the video-in stream 301*a* may contain live or prerecorded content and the encoded stream 301*b* may contain an advertisement. In an IFPD use case, the video-in stream 301*a* may contain a presentation (e.g., educational materials, business materials) and the encoded stream 301*b* may contain a live video feed of an audience member (e.g., student, employee).

In some embodiments, the inline compression and decompression engines 310, 322 may use H.264 AVC-intra based coding to compress/decompress frames of the video-in stream 301*a* inline (e.g., without any inter-frame dependencies). AVC-intra is an intra-frame-only compression scheme that consumes video frames in different formats (e.g., 4:2:0, 4:2:2, 4:4:4, 8-bit, 10-bit, and 12-bit) and compresses them at a constant 200 megabits per second (Mbps) with guaranteed "visually lossless performance." Table 1 shows the compression performance on system 300 when the video-in stream 301a is buffered as AVC-intra-compressed video versus raw video.

As shown in Table 1, inline compression of the raw video-in stream using AVC-intra-based compression can provide up to 45× compression efficiency—without introducing any visual loss—compared to the raw video-in stream. Further, since the compression is performed on a frame-by-frame basis (e.g., spatial/intra-only compression), the latency overhead for compression/decompression is minimal, as any given frame can be compressed or decompressed on demand without having to access, analyze, or decompress any other frames in the stream.

DisplayPort (DP) interfaces, type-C interfaces, and/or video graphics array (VGA) interfaces, among other examples. Moreover, the display controller 324 may include a physical layer (PHY) display controller for the video-out interface 326, such as HDMI PHYs, DisplayPort PHYs, type-C PHYs, VGA PHYs, and so forth.

The video source device 302 may be, for example, a media player, laptop, personal computer, and/or any other device that provides video content to the video processing device 304 (e.g., via the video-in interface 306).

In various embodiments, the inline video compression engine 310, inline video decompression engine 322, and/or video decoder 316 may include any combination of hard-

TABLE 1

| | | | |
|---|---|---|---|
| Compression performance of inline compressed video versus raw video | | | |
| VIDEO SIZE | SCHEME | MEMORY REQUIREMENTS | REMARKS |
| 1 RGB frame @ 4K resolution | raw video | 24 MB | |
| 1 second of video with RGB frames @ 4K resolution/60 frames per second (fps) | raw video | 1.5 GB | Allows one second of video to be buffered |
| 1 minute of video with RGB frames @ 4K resolution/60 fps | raw video | 60.5 GB | Allows one minute of video to be buffered |
| 5 minutes of video with RGB frames @ 4K resolution/60 fps | raw video | 300.2 GB | Allows five minutes of video to be buffered |
| 1 second of video with RGB frames @ 4K resolution/60 fps | inline compression | 25 MB | Allows one second of video to be buffered |
| 1 minute of video with RGB frames @ 4K resolution/60 fps | inline compression | 1.5 GB | Allows one minute of video to be buffered |
| 5 minutes of video with RGB frames @ 4K resolution/60 fps | inline compression | 7.5 GB | Allows five minutes of video to be buffered |

In some embodiments, video processing device 304 may be implemented as a system-on-a-chip (SoC), discrete graphics card, or custom ASIC/FPGA video processor, among other examples. Moreover, in some embodiments, system 300 and/or video processing device 304 may be part of a broader device or system, such as a digital media player (e.g., video streaming device, disc-based media player such as Blu-Ray or DVD, projector), a digital display device or system (e.g., television, monitor, interactive flat panel display/interactive whiteboard, touchscreen display, digital sign, multi-display video wall), a video wall controller (e.g., a physical case or housing with one or more processing devices to drive the displays of a video wall), a client device (e.g., personal computer, laptop, tablet, mobile device/phone), a video game console, or an edge computing appliance (e.g., edge server), among other examples.

While the illustrated embodiment includes one video source device 302, one display device 328, and one video processing device 304 with one video-in interface 306, one video-out interface 326, and one display controller 324, other embodiments may include any number of video source devices 302, display devices 328, video processing devices 304, video-in interfaces 306, video-out interfaces 326, and/or display controllers 324.

In some embodiments, for example, system 300 may be implemented as a video wall with multiple display devices 328 driven by one or more video processing devices 304 (e.g., a four-display video wall driven by a single video processing device 304 with four video-out ports 326, or a four-display video wall driven by four video processing devices 304 with one video-out port 326 per device 304).

The video-in and/or video-out interfaces 306, 326 may include any suitable types of video/display interfaces, such as high-definition multimedia interface (HDMI) interfaces, ware circuitry and/or software for performing inline video/image compression/decompression and/or video encoding/decoding. Moreover, in some embodiments, the inline video compression engine 310, inline video decompression engine 322, and/or video decoder 316 may be separate physical components or integrated together as part of the same physical component.

In various embodiments, the video analytics engine 308 may include any combination of hardware circuitry and/or software for performing video analytics. For example, the video analytics engine 308 may be implemented on a CPU, GPU, VPU, TPU, ASIC, or FPGA. Examples of the tasks that may be performed by the video analytics engine 308 include video encoding/decoding, preprocessing (e.g., color space conversion, scaling resizing, cropping), pixel segmentation, feature detection/extraction, object detection/tracking, object identification, facial recognition, event/action detection, scene recognition, motion estimation, pose estimation, camera/sensor fusion (e.g., fusing together visual/sensor data captured by multiple homogenous or heterogenous vision sensors, such as cameras, thermal sensors, lidar, radar), and so forth.

Moreover, the tasks, processing modules, and/or models used by the video analytics engine 308 may be implemented using any suitable visual processing, artificial intelligence, and/or machine learning techniques, including artificial neural networks (ANNs), deep neural networks (DNNs), convolutional neural networks (CNNs) (e.g., Inception/ResNet CNN architectures), other deep learning neural networks or feed-forward artificial neural networks, pattern recognition, scale-invariant feature transforms (SIFT), principal component analysis (PCA), discrete cosine transforms (DCT), and so forth.

In some embodiments, for example, video analytics engine 308 may implement one or more video content recognition tasks (e.g., object detection/identification/tracking, action detection, scene recognition) using convolutional neural networks (CNNs) and/or other types of artificial neural network (ANNs) (e.g., a CNN trained to detect or identify certain types of objects).

The "XPU" 305 may include any type or combination of processing circuitry or processing units used to implement the control flow and/or functionality of video processing device 304 as described above. In some embodiments, for example, the "XPU" 305 may include processors, processor cores, central processing units (CPUs), graphics processing units (GPUs), vision processing units (VPUs), tensor processing units (TPUs), application-specific integrated circuits (ASICs), field-programmable gate arrays (FPGAs), and/or other types of XPUs. Moreover, in some embodiments, the XPUs 305 may be used to implement the inline video compression/decompression engines 310, 322, video decoder 316, video analytics engine 308, and/or any other components or functionality of video processing device 304.

In various embodiments, system 300 and/or video processing device 304 may also include a variety of other computing components or resources, including, but not limited to, input/output (I/O) circuitry (e.g., I/O interfaces and controllers), touchscreen controllers, antennas, cameras, and/or microphones.

As used herein, "display," "digital display" "display device," "screen," "display screen," "monitor," and "display monitor" have the same meaning and refer to a structure to visibly convey an image, text, and/or other visual content to a human in response to an electrical control signal. As used herein, "a multi-display system" or "video wall" refers to structures that are composed of multiple displays that operate in unison to visibly convey an image, video, text, and/or other visual content to a human in response to an electrical control signal. Moreover, displays may include televisions, monitors, embedded screens, touchscreens, projectors, or any other type of display. Each display may be implemented as a light-emitting diode (LED) display, a liquid crystal display (LCD), a touchscreen, and/or any other suitable type of screen.

Figure 4:
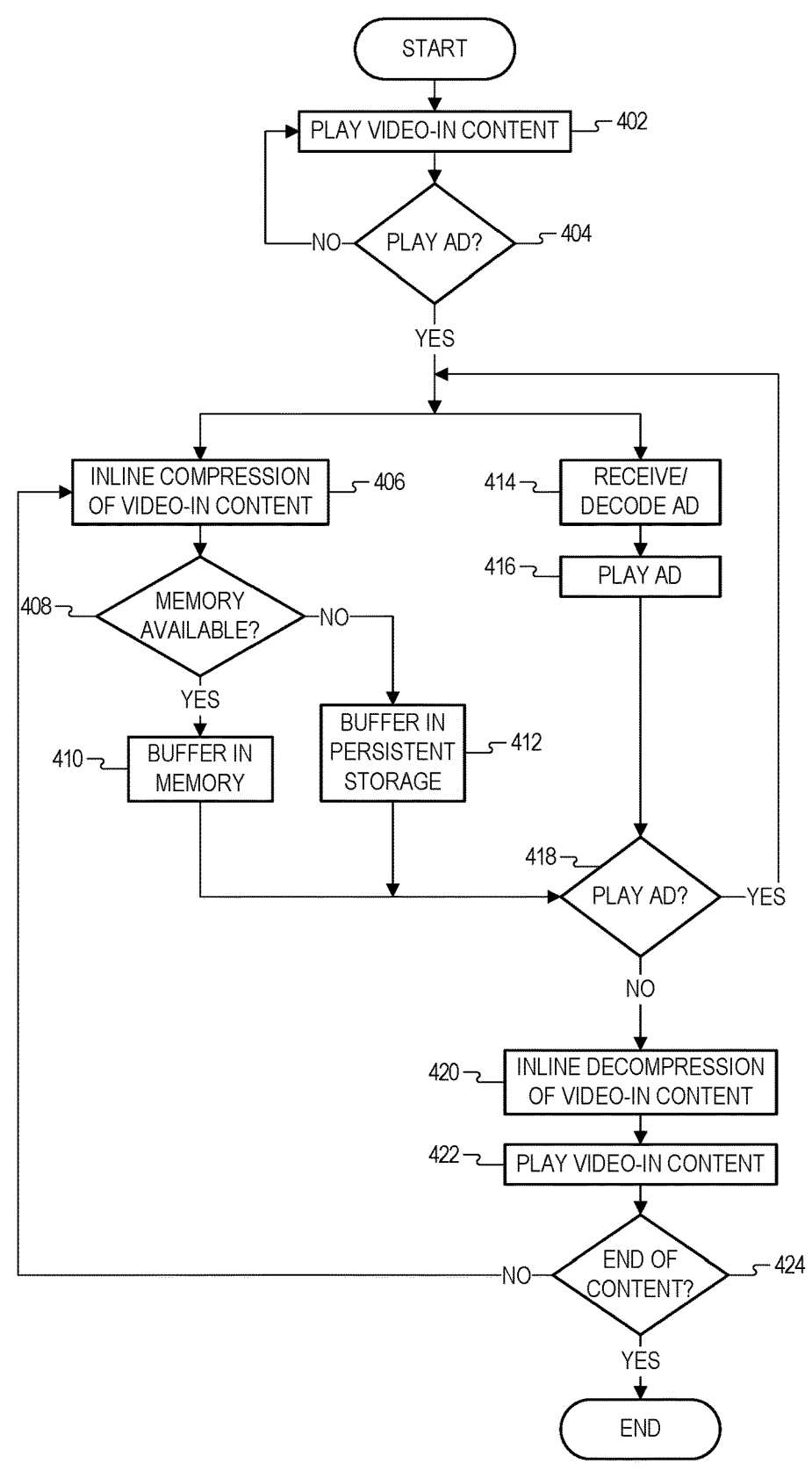
FIG. 4 illustrates a flowchart for a multi-stream digital signage use case in accordance with certain embodiments.

FIG. 4 illustrates a flowchart 400 for a multi-stream digital signage use case in accordance with certain embodiments. In some embodiments, flowchart 400 may be performed by or using the devices and systems described throughout this disclosure (e.g., system 300 of FIG. 3).

The process flow begins at block 402 by playing video content received over a video-in port on a digital signage display, such as a sporting event, a television show or movie, or another type of live or prerecorded video content. The video content received over the video-in port—referred to as "video-in content"—may contain raw or uncompressed video frames.

The process flow then proceeds to block 404 to determine whether to play an advertisement. In some embodiments, for example, advertisement(s) may be played periodically (e.g., based on a particular time interval), at certain breakpoints in the video-in content (e.g., predetermined/static breakpoints and/or dynamic breakpoints determined using video analytics, such as a lull in activity during a sporting event), and/or based on the current audience of the digital signage (e.g., when a particular audience demographic is detected near the signage using video analytics/computer vision).

Upon determining that an advertisement should not be played, the process flow proceeds back to block 402 to continue playing the video-in content.

Upon determining that an advertisement should be played, however, the process flow proceeds in parallel to blocks 406 and 414 to simultaneously compress/buffer the incoming video-in content while playing an advertisement.

For example, at block 406, inline compression is performed on the video-in content by compressing each incoming frame individually (e.g., independent of—and without any dependencies on—other frames in the stream).

At block 408, it is determined whether sufficient memory is available to buffer the compressed video-in frames in memory (e.g., based on a memory utilization threshold). If sufficient memory is available, the compressed video-in frames are stored in a video buffer in memory at block 410. If the system is low on memory, however, the compressed video-in frames are stored in a video buffer on a persistent storage device at block 412.

Meanwhile, an advertisement—which may be in the form of encoded video—is received and decoded at block 414, and the decoded advertisement is then played at block 416. For example, the advertisement may be read from a persistent storage device or received remotely over a network. Moreover, the advertisement may contain encoded video frames that must be decoded prior to playback.

The process flow then proceeds to block 418 to determine whether to play another advertisement. In some embodiments, for example, advertisements may be played successively, for a certain duration of time (e.g., during a commercial break), based on the current audience of the digital signage (e.g., when a particular audience demographic is detected near the signage using video analytics/computer vision), and/or based on analysis of the incoming video-in content (e.g., when a lull in activity is detected in the video-in content using video analytics, such as a timeout during a sporting event).

Upon determining to play another advertisement, the process flow proceeds back to blocks 406 and 414 to continue compressing/buffering the incoming video-in content while simultaneously playing another advertisement.

Upon determining not to play another advertisement, however, the process flow proceeds to blocks 420-422 to resume playback of the video-in content by decompressing and playing the buffered video-in content. For example, at block 420, inline decompression is performed on the compressed video-in content by individually decompressing each compressed frame in the video buffer. The decompressed video-in content is then played at block 422.

The process flow then proceeds to block 424 to determine whether the end of the video-in content has been reached. If the end of the video-in content has not been reached (e.g., video content is still being received via the video-in port), the process flow cycles back through blocks 406-422 to continue compressing incoming video-in content, playing advertisements, and/or playing the video-in content.

If the end of the video-in content has been reached (e.g., video content is no longer being received via the video-in port), the process flow may be complete. In some embodiments, however, the process flow may restart and/or certain blocks may be repeated. For example, in some embodiments, the process flow may restart at block 402 to continue playing the same or different video content.

Figure 5:
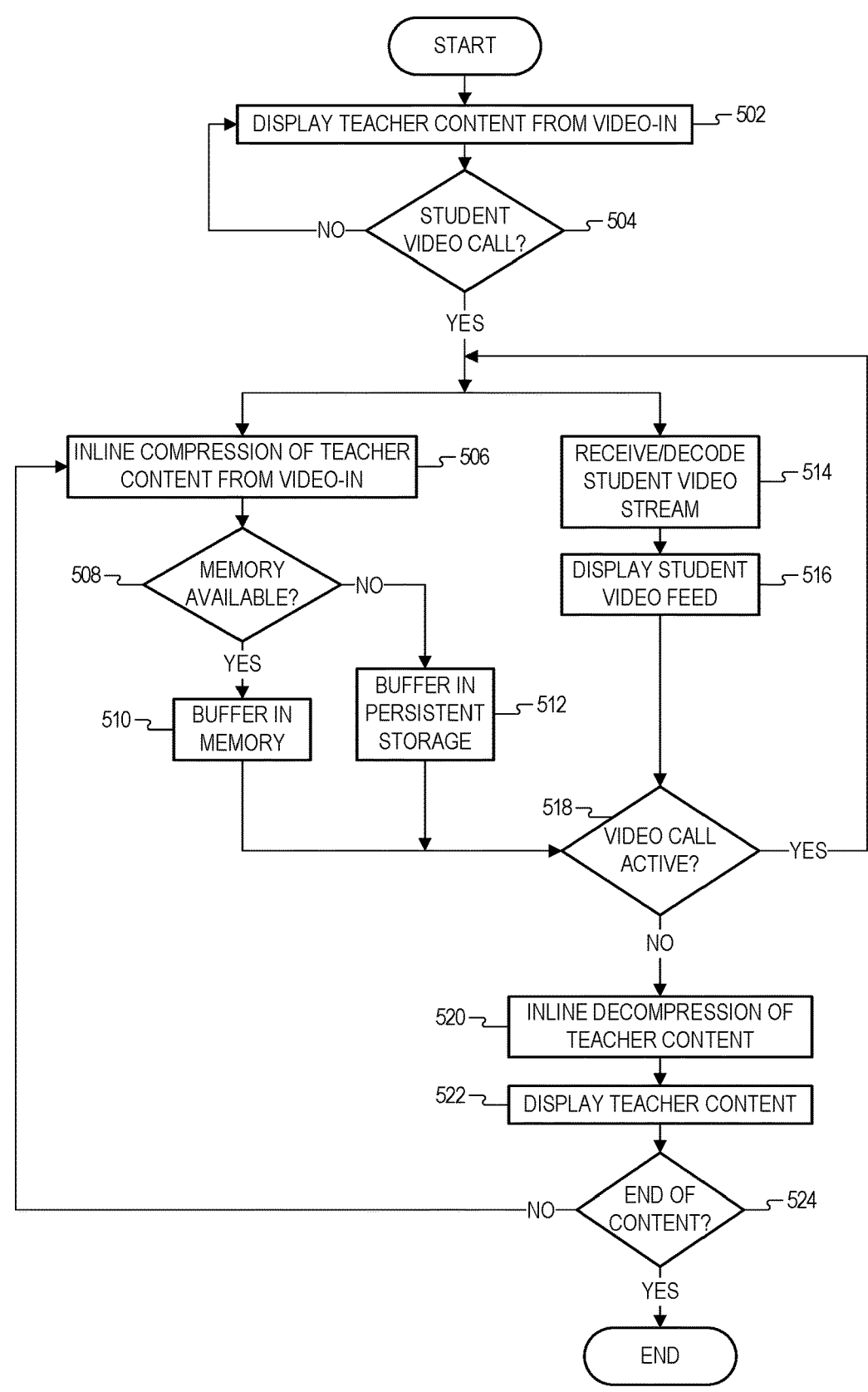
FIG. 5 illustrates a flowchart for a multi-stream interactive display use case in accordance with certain embodiments.

FIG. 5 illustrates a flowchart 500 for a multi-stream interactive flat panel display (IFPD) use case in accordance with certain embodiments. In some embodiments, flowchart 500 may be performed by or using the devices and systems described throughout this disclosure (e.g., system 300 of FIG. 3).

In the illustrated example, a process flow for a virtual classroom IFPD use case is shown. The process flow begins at block 502 by displaying content received over a video-in port, such as education material presented by a teacher. The content received over the video-in port—referred to as "teacher content" in this example—may contain raw or uncompressed video frames.

The process flow then proceeds to block 504 to determine whether to interrupt the teacher content and switch to a student video call (e.g., a live video stream of a student). In some embodiments, for example, a student video call may be manually requested or initiated by a participant—such as a student or teacher—via a user interface (UI) mechanism (e.g., a "raise hand" or "call on" button), or a student video call may be initiated automatically when certain behavior is detected using audio or video analytics (e.g., a teacher verbally calls on a student, a student raises their hand, etc.).

Upon determining not to switch to a student video call, the process flow proceeds back to block 502 to continue playing the video-in teacher content.

Upon determining to switch to a student video call, however, the process flow proceeds in parallel to blocks 506 and 514 to simultaneously compress/buffer the incoming video-in teacher content while displaying the student video call.

For example, at block 506, inline compression is performed on the video-in teacher content by compressing each incoming frame individually (e.g., independent of—and without any dependencies on—other frames in the stream). At block 508, it is determined whether sufficient memory is available to buffer the compressed frames of teacher content in memory (e.g., based on a memory utilization threshold). If sufficient memory is available, the compressed frames are stored in a video buffer in memory at block 510. If the system is low on memory, however, the compressed frames are stored in a video buffer on a persistent storage device at block 512.

Meanwhile, the student video call is received as an encoded video stream (e.g., over a network) and decoded at block 514, and the decoded video feed of the student is then displayed on the IFPD at block 516.

The process flow then proceeds to block 518 to determine whether the student video call is still active. In some embodiments, for example, a student video call may remain active until being terminated either manually or automatically. For example, a student video call may be manually terminated by a participant (e.g., student or teacher) via a UI mechanism (e.g., an "end call" button), or the student video call may be terminated automatically when certain behavior is detected using audio/video analytics (e.g., the student stops speaking, the teacher or another student starts speaking, etc.).

Upon determining that the student video call is still active, the process flow proceeds back to blocks 506 and 514 to continue compressing/buffering the incoming video-in teacher content while continuing to display the student video feed.

Upon determining that the student video call has ended, however, the process flow proceeds to blocks 520-522 to resume playback of the teacher content by decompressing and displaying the buffered teacher content. For example, at block 520, inline decompression is performed on the compressed teacher content by individually decompressing each compressed frame in the video buffer. The decompressed teacher content is then displayed at block 522.

The process flow then proceeds to block 524 to determine whether the end of the teacher content has been reached (e.g., based on whether teacher content is still being received via the video-in port). If the end of the teacher content has not been reached, the process flow cycles back through blocks 506-522 to continue compressing incoming teacher content, displaying student video feeds, and/or displaying the teacher content.

If the end of the teacher content has been reached, the process flow may be complete. In some embodiments, however, the process flow may restart and/or certain blocks may be repeated. For example, in some embodiments, the process flow may restart at block 502 to continue displaying the same or different content.

Figure 6:
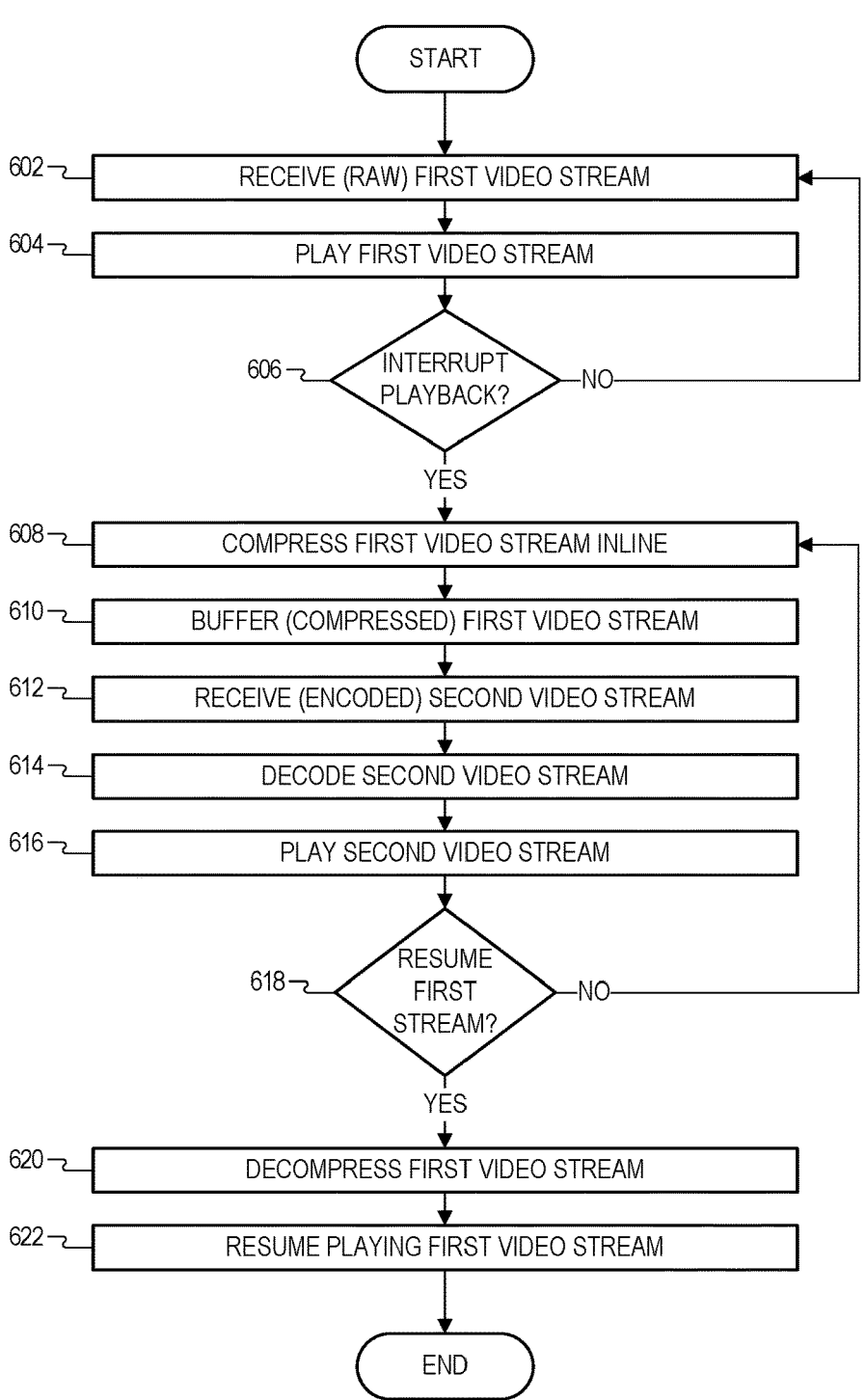
FIG. 6 illustrates a flowchart for dynamically processing and displaying video from multiple sources in accordance with certain embodiments.

FIG. 6 illustrates a flowchart 600 for dynamically processing and displaying video from multiple sources in accordance with certain embodiments. In some embodiments, flowchart 600 may be performed by or using the devices and systems described throughout this disclosure (e.g., system 300 of FIG. 3).

In some embodiments, for example, flowchart 600 may be performed or implemented by one or more electronic devices to dynamically display multiple sources of video content on a digital display device or system (e.g., interactive flat panel display, digital signage, multi-display video wall).

In a digital signage use case, for example, the electronic device(s) may blend and/or alternate playback between video streams containing live video content and advertisements.

In a virtual meeting use case (e.g., using an interactive display), the electronic device(s) may blend and/or alternate playback between video streams containing presentation materials and live video of participants. For example, in a virtual classroom, the video streams may contain teacher content (e.g., educational materials presented by the teacher, live video of the teacher) and student content (e.g., live video of the students, student presentations, homework assignments). In a virtual office or conference room, the video streams may contain business content (e.g., work/employee presentations) and live video of meeting participants (e.g., employees, colleagues, business partners, clients, customers).

Each electronic device may include one or more video-in interfaces (e.g., to receive video content from external video sources or devices), one or more video-out interfaces (e.g., to interface with display devices), one or more display controllers (e.g., to cause video frames to be displayed on the display devices via the video-out interfaces), and/or video processing circuitry.

The video-out interfaces may include any suitable types of display interfaces, such as high-definition multimedia interface (HDMI) interfaces, DisplayPort (DP) interfaces, type-C interfaces, and/or video graphics array (VGA) interfaces, among other examples. Moreover, the display controllers may include physical layer (PHY) display controllers for the respective video-out interfaces, such as HDMI PHYs, DisplayPort PHYs, type-C PHYs, VGA PHYs, and so forth.

The video processing circuitry may include, for example, inline video compression/decompression engines, video encoders/decoders, video analytics accelerators, processors, processor cores, central processing units (CPUs), graphics processing units (GPUs), vision processing units (VPUs), tensor processing units (TPUs), application-specific integrated circuits (ASICs), field-programmable gate arrays (FPGAs), and/or other types of XPUs.

In various embodiments, each electronic device may also include a variety of other computing resources, such as memory circuitry (e.g., main memory, persistent storage devices) and/or communication circuitry (e.g., input/output (I/O) circuitry, network interface controller (NIC) circuitry, antenna(s)), among other examples.

In some embodiments, each electronic device may be implemented as a system-on-a-chip (SoC), a discrete graphics card, or a custom ASIC/FPGA video processor, among other examples. Moreover, some or all of the respective electronic devices may be part of a broader device or system, such as a digital media player (e.g., video streaming device, disc-based media player such as Blu-Ray or DVD, projector), a digital display device or system (e.g., television, monitor, interactive flat panel display, digital sign, multi-display video wall), a video wall controller (e.g., a physical case or housing with one or more processing devices to drive the displays of a video wall), a video game console, or an edge computing appliance (e.g., edge server), among other examples.

The flowchart begins at block 602 by receiving a first video stream containing raw video. For example, the first video stream may contain raw or uncompressed video frames received via a video-in interface/port or any other video source, such as an input/output (I/O) interface (e.g., a PCIe interconnect), wireless interface, local storage device, and so forth.

The first video stream may contain any type of video content, including, but not limited to, live video content, prerecorded video content, statically-generated content, or dynamically-generated content. Examples of video content that may be included in the first stream include, but are not limited to, sporting events, concerts, television shows, movies, advertisements, presentations, and video calls.

The flowchart then proceeds to block 604 to begin playing the first video stream on a digital display device (e.g., via a display controller and/or video-out interface). For example, a display controller may cause the raw (e.g., uncompressed) frames of the first video stream to be displayed on the display device via a video-out interface.

The flowchart then proceeds to block 606 to determine whether to interrupt (e.g., pause) playback of the first video stream to switch to another stream. For example, the first stream may be interrupted to switch playback to another stream periodically (e.g., based on a time interval and/or timer), at certain breakpoints in the video content (e.g., static or predetermined breakpoints, dynamic breakpoints determined using video analytics), based on the current audience (e.g., viewers detected near the display device using video analytics/computer vision), and/or based on manual user interface (UI) mechanisms.

In some embodiments, for example, video analytics circuitry may be used to analyze content in the respective video streams to determine when to interrupt playback of the first stream and switch to another stream (or vice versa). As examples, playback may be interrupted upon detecting low activity in a live event (e.g., timeout or halftime during a sporting event) and/or certain actions or behavior (e.g., raising a hand, speaking, saying a name).

Alternatively, or additionally, the video analytics circuitry may be used to detect the surrounding physical environment of the display device—including nearby viewers actively watching the display device—by analyzing video captured by a camera positioned on or near the display device. In this manner, decisions to interrupt or switch video streams can be made based on the current audience of the display device. For example, when a particular demographic is detected in the audience (e.g., based on age, gender, or culture), an advertisement targeted for that demographic may be played.

Upon determining not to interrupt playback of the first video stream at block 606, the flowchart cycles back through blocks 602-604 to continue receiving and playing the first video stream.

Upon determining to interrupt or pause playback of the first video stream to play another stream at block 606, the flowchart proceeds to blocks 608-616 to compress and buffer the first video stream while simultaneously playing a second video stream.

For example, at block 608, playback of the first video stream is "paused" and inline compression is performed on the first video stream by compressing each incoming frame individually (e.g., independent of—and without any dependencies on—other frames in the stream). In this manner, each raw (e.g., uncompressed) frame of the first stream is independently compressed into a compressed frame having no inter-frame dependencies.

In various embodiments, the compression may be performed using any type of video/image compression/encoding, such as a video codec with support for intra-frame compression (e.g., H.264 Advance Video Coding (AVC), H.265 High Efficiency Video Coding (HEVC), AOMedia Video 1 (AV1), VP9, MPEG-5 Essential Video Coding (EVC)), or a standard image or file compression format (e.g., PNG, JPEG, 7-zip), among other examples. Further, in some embodiments, the compression may be performed or accelerated using video compression circuitry, such as a hardware-based video encoder or video compression engine.

The flowchart then proceeds to block 610 to buffer the (compressed) first video stream. For example, the compressed frames of the first video stream may be stored in a video buffer in memory circuitry, such as volatile memory and/or non-volatile memory or storage. In some embodiments, for example, the compressed frames may be stored in the video buffer on volatile memory (e.g., main memory) until a memory utilization threshold is exceeded, and after the memory utilization threshold is exceeded, the compressed frames may be stored in the video buffer on a non-volatile storage device (e.g., persistent storage).

The flowchart then proceeds to block 612 to receive a second video stream containing encoded frames. In some embodiments, for example, the second video stream may be encoded using a video codec with support for inter-frame coding and/or motion estimation (e.g., H.264 AVC, H.265 HEVC, AV1, VP9, MPEG-5 EVC). Moreover, in some embodiments, the second video stream may be streamed and received over a network (e.g., via network interface circuitry), or the second video stream may be stored on and read from a non-volatile storage device (e.g., HDD, SSD, flash memory card).

The second video stream may contain any type of video content, including, but not limited to, live video content, prerecorded video content, statically-generated content, or dynamically-generated content. Examples of video content that may be included in the second stream include, but are not limited to, sporting events, concerts, television shows, movies, advertisements, presentations, and video calls.

The flowchart then proceeds to block 614 to decode the second video stream. For example, the encoded frames in the second video stream are decoded into decoded frames using a decoding algorithm that matches the particular encoding algorithm used to encode the frames. Moreover, in some embodiments, the decoding may be performed or accelerated using video decoder circuitry (e.g., a hardware-based video decoder).

The flowchart then proceeds to block 616 to play the second video stream on the display device. For example, a display controller may cause the decoded frames of the second video stream to be displayed on the display device via a video-out interface.

The flowchart then proceeds to block 618 to determine whether to resume playback of first video stream. In some embodiments, for example, playback of the first video stream may resume after the second video stream is finished playing, after a certain number of advertisements have been played, after a certain amount of time, at certain breakpoints in the video content (e.g., static or predetermined break-points, dynamic breakpoints determined using video analytics), based on the current audience (e.g., viewers detected near the display device using video analytics/computer vision), and/or based on manual user interface (UI) mechanisms.

Upon determining not to resume playback of the first video stream at block 618, the flowchart cycles back through blocks 608-616 to continue receiving, compressing, and buffering the first video stream while also receiving, decoding, and playing a second video stream.

Upon determining to resume playback of the first video stream at block 618, the flowchart proceeds to blocks 620-622 to decompress and play the first video stream.

For example, at block 620, the compressed frames of the first video stream are read from the video buffer and decompressed. In some embodiments, for example, the compressed frames in the video buffer may be individually decompressed into decompressed frames using a decompression algorithm that matches the particular compression algorithm used to compress the frames. Moreover, in some embodiments, the decompression may be performed or accelerated using video decompression circuitry, such as a hardware-based video decoder or video decompression engine.

The flowchart then proceeds to block 622 to resume playing the first video stream on the display device (e.g., via a display controller and/or video-out interface). For example, a display controller may cause the decompressed frames of the first video stream to be displayed on the display device via a video-out interface.

At this point, the flowchart may be complete. In some embodiments, however, the flowchart may restart and/or certain blocks may be repeated. For example, in some embodiments, the flowchart may restart at block 602 to continue receiving, processing, and/or playing multiple video streams.

Example Computing Embodiments

The following sections present examples of various computing embodiments that may be used to implement the multi-stream video processing solution described throughout this disclosure. In particular, any of the devices, systems, or functionality described in the preceding sections may be implemented using the computing embodiments described below.

Edge Computing

Figure 7:
FIG. 7 illustrates an overview of an edge cloud configuration for edge computing.
Figure 7:

FIG. 7 is a block diagram 700 showing an overview of a configuration for edge computing, which includes a layer of processing referred to in many of the following examples as an "edge cloud". As shown, the edge cloud 710 is co-located at an edge location, such as an access point or base station 740, a local processing hub 750, or a central office 720, and thus may include multiple entities, devices, and equipment instances. The edge cloud 710 is located much closer to the endpoint (consumer and producer) data sources 760 (e.g., autonomous vehicles 761, user equipment 762, business and industrial equipment 763, video capture devices 764, drones 765, smart cities and building devices 766, sensors and IoT devices 767, etc.) than the cloud data center 730. Compute, memory, and storage resources which are offered at the edges in the edge cloud 710 are critical to providing ultra-low latency response times for services and functions used by the endpoint data sources 760 as well as reduce network backhaul traffic from the edge cloud 710 toward cloud data center 730 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 8:
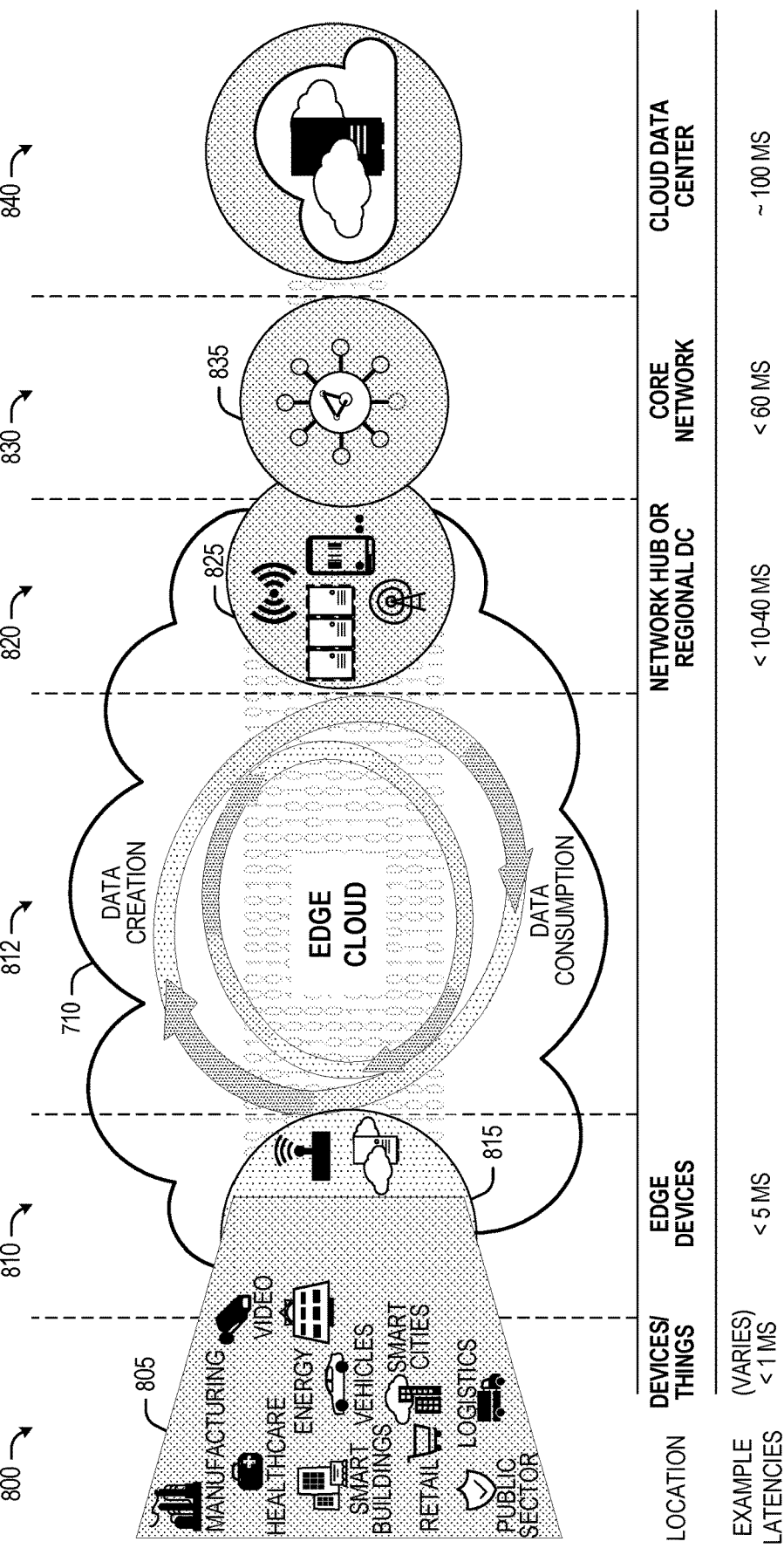
FIG. 8 illustrates operational layers among endpoints, an edge cloud, and cloud computing environments.

FIG. 8 illustrates operational layers among endpoints, an edge cloud, and cloud computing environments. Specifically, FIG. 8 depicts examples of computational use cases 805, utilizing the edge cloud 710 among multiple illustrative layers of network computing. The layers begin at an endpoint (devices and things) layer 800, which accesses the edge cloud 710 to conduct data creation, analysis, and data consumption activities. The edge cloud 710 may span multiple network layers, such as an edge devices layer 810 having gateways, on-premise servers, or network equipment (nodes 815) located in physically proximate edge systems; a network access layer 820, encompassing base stations, radio processing units, network hubs, regional data centers (DC), or local network equipment (equipment 825); and any equipment, devices, or nodes located therebetween (in layer 812, not illustrated in detail). The network communications within the edge cloud 710 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 800, under 5 ms at the edge devices layer 810, to even between 10 to 40 ms when communicating with nodes at the network access layer 820. Beyond the edge cloud 710 are core network 830 and cloud data center 840 layers, each with increasing latency (e.g., between 50-60 ms at the core network layer 830, to 100 or more ms at the cloud data center layer). As a result, operations at a core network data center 835 or a cloud data center 845, with latencies of at least 50 to 100 ms or more, will not be able to accomplish many time-critical functions of the use cases 805. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 835 or a cloud data center 845, a central office or content data network may be considered as being located within a "near edge" layer ("near" to the cloud, having high latency values when communicating with the devices and endpoints of the use cases 805), whereas an access point, base station, on-premise server, or network gateway may be considered as located within a "far edge" layer ("far" from the cloud, having low latency values when communicating with the devices and endpoints of the use cases 805). It will be understood that other categorizations of a particular network layer as constituting a "close", "local", "near", "middle", or "far" edge may be based on latency, distance, number of network hops, or other measurable characteristics, as measured from a source in any of the network layers 800-840.

The various use cases 805 may access resources under usage pressure from incoming streams, due to multiple services utilizing the edge cloud. To achieve results with low latency, the services executed within the edge cloud 710 balance varying requirements in terms of: (a) Priority (throughput or latency) and Quality of Service (QoS) (e.g., traffic for an autonomous car may have higher priority than a temperature sensor in terms of response time requirement;

or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 710 may provide the ability to serve and respond to multiple applications of the use cases 805 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 710 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 710 (network layers 800-840), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 710.

As such, the edge cloud 710 is formed from network components and functional features operated by and within edge gateway nodes, edge aggregation nodes, or other edge compute nodes among network layers 810-830. The edge cloud 710 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 710 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 710 may be servers, multi-tenant servers, appliance computing devices, and/or any other type of computing devices. For example, the edge cloud 710 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 15B. The edge cloud 710 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 9:
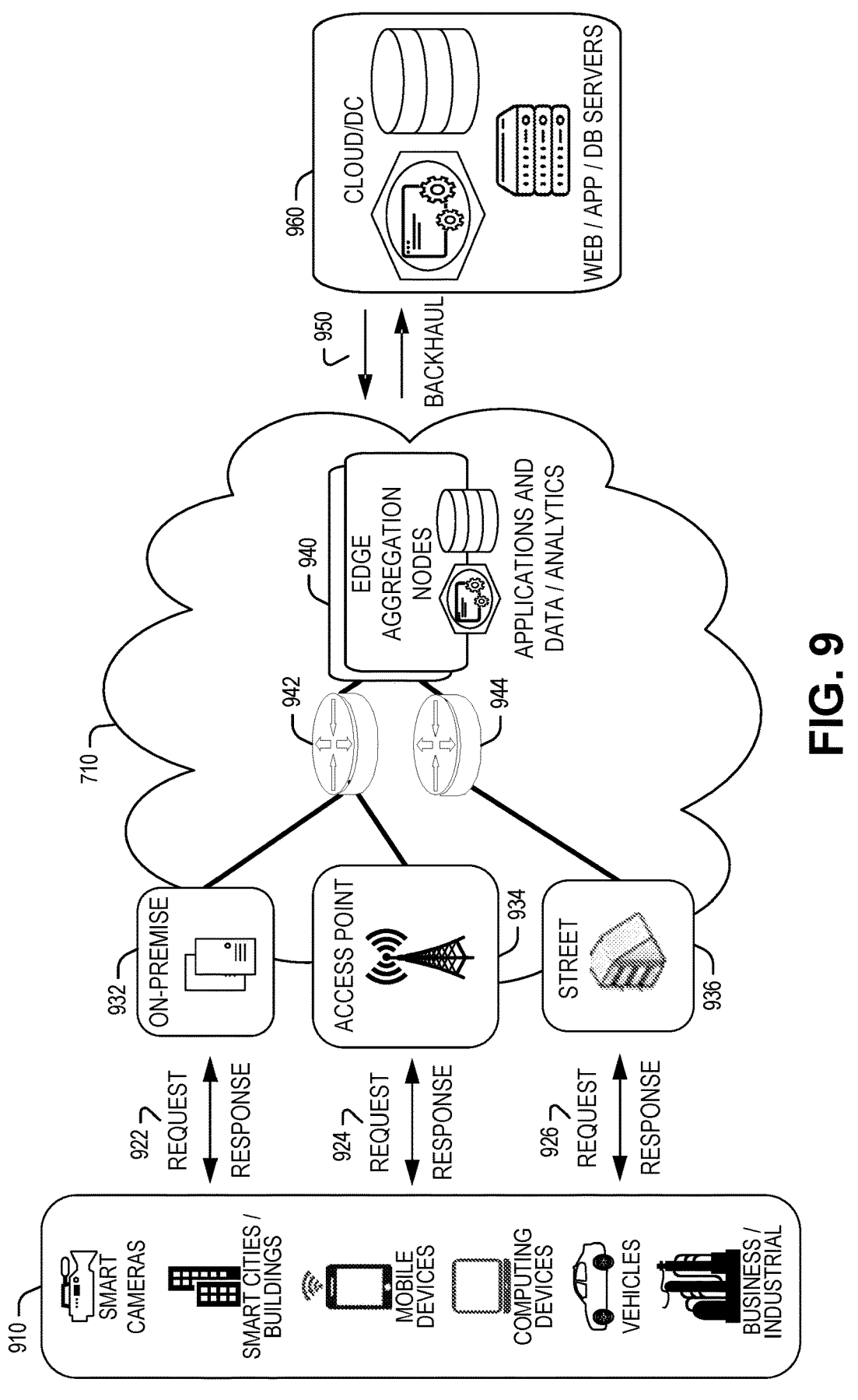
FIG. 9 illustrates an example approach for networking and services in an edge computing system.

In FIG. 9, various client endpoints 910 (in the form of smart cameras, mobile devices, computers, autonomous vehicles, business computing equipment, industrial processing equipment) exchange requests and responses that are specific to the type of endpoint network aggregation. For instance, client endpoints 910 may obtain network access via a wired broadband network, by exchanging requests and responses 922 through an on-premise network system 932. Some client endpoints 910, such as smart cameras, may obtain network access via a wireless broadband network, by exchanging requests and responses 924 through an access point (e.g., cellular network tower) 934. Some client endpoints 910, such as autonomous vehicles may obtain network access for requests and responses 926 via a wireless vehicular network through a street-located network system 936. However, regardless of the type of network access, the TSP may deploy aggregation points 942, 944 within the edge cloud 710 to aggregate traffic and requests. Thus, within the edge cloud 710, the TSP may deploy various compute and storage resources, such as at edge aggregation nodes 940, to provide requested content. The edge aggregation nodes 940 and other systems of the edge cloud 710 are connected to a cloud or data center 960, which uses a backhaul network 950 to fulfill higher-latency requests from a cloud/data center for websites, applications, database servers, etc. Additional or consolidated instances of the edge aggregation nodes 940 and the aggregation points 942, 944, including those deployed on a single server framework, may also be present within the edge cloud 710 or other areas of the TSP infrastructure.

Internet-of-Things

Figure 10:
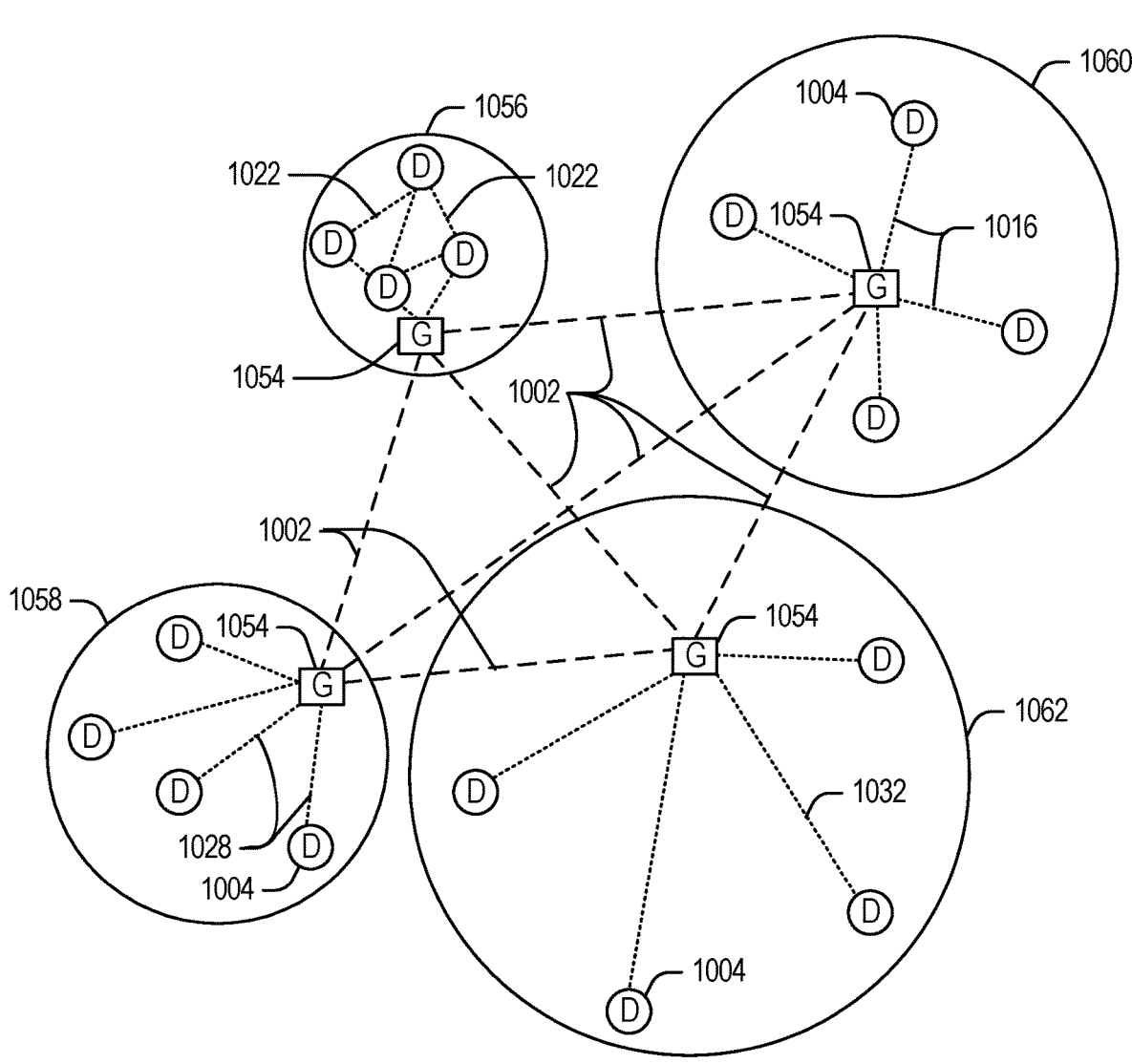
FIG. 10 illustrates a domain topology for respective internet-of-things (IoT) networks coupled through links to respective gateways, according to an example.

FIG. 10 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, doorbells (e.g., doorbell cameras), cameras, alarms, motion sensors, and the like. The IoT devices may be accessible through remote computers, servers, and other systems, for example, to control systems or access data.

Figure 11:
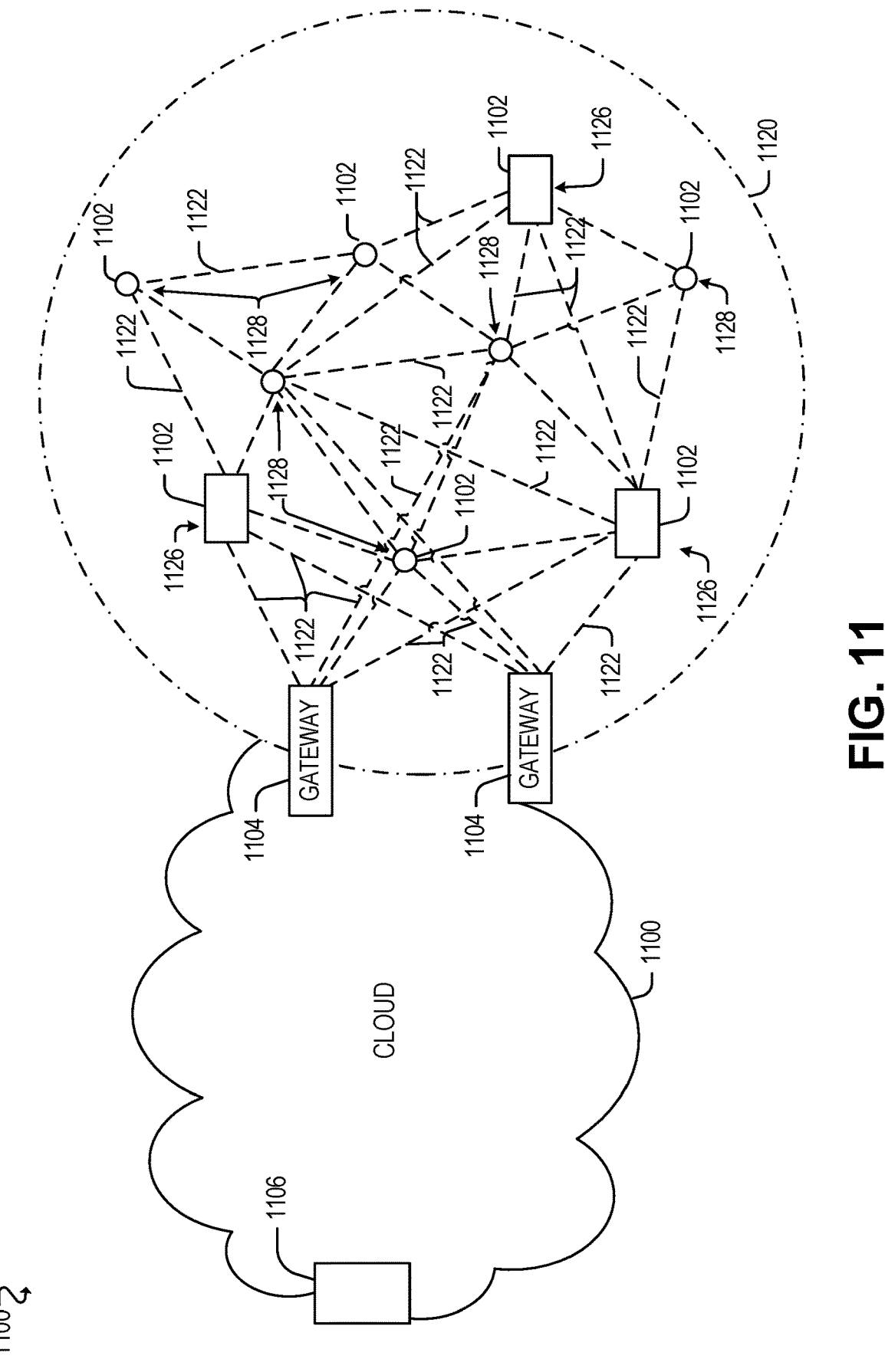
FIG. 11 illustrates a cloud computing network in communication with a mesh network of IoT devices operating as a fog device at the Edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 10 and 11, present a number of new challenges in a heterogeneous network of connectivity comprising a combination of wired and wireless technologies.

FIG. 10 specifically provides a simplified drawing of a domain topology that may be used for a number of internet-of-things (IoT) networks comprising IoT devices 1004, with the IoT networks 1056, 1058, 1060, 1062, coupled through backbone links 1002 to respective gateways 1054. For example, a number of IoT devices 1004 may communicate with a gateway 1054, and with each other through the gateway 1054. To simplify the drawing, not every IoT device 1004, or communications link (e.g., link 1016, 1022, 1028, or 1032) is labeled. The backbone links 1002 may include any number of wired or wireless technologies, including optical networks, and may be part of a local area network (LAN), a wide area network (WAN), or the Internet. Additionally, such communication links facilitate optical signal paths among both IoT devices 1004 and gateways 1054, including the use of MUXing/deMUXing components that facilitate interconnection of the various devices.

The network topology may include any number of types of IoT networks, such as a mesh network provided with the network 1056 using Bluetooth low energy (BLE) links 1022.

Other types of IoT networks that may be present include a wireless local area network (WLAN) network 1058 used to communicate with IoT devices 1004 through IEEE 802.11 (Wi-Fi®) links 1028, a cellular network 1060 used to communicate with IoT devices 1004 through an LTE/LTE-A (4G) or 5G cellular network, and a low-power wide area (LPWA) network 1062, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "Edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1004, such as over the backbone links 1002, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1058, for instance, may use systems that perform standards conversion to provide multi-standard connectivity, enabling IoT devices 1004 using different protocols to communicate. Further systems may provide seamless interconnectivity across a multi-standard infrastructure comprising visible Internet resources and hidden Internet resources.

Communications in the cellular network 1060, for instance, may be enhanced by systems that offload data, extend communications to more remote devices, or both. The LPWA network 1062 may include systems that perform non-Internet protocol (IP) to IP interconnections, addressing, and routing. Further, each of the IoT devices 1004 may include the appropriate transceiver for wide area communications with that device. Further, each IoT device 1004 may include other transceivers for communications using additional protocols and frequencies. This is discussed further with respect to the communication environment and hardware of an IoT processing device depicted in FIGS. 12 and 13.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 11 below.

FIG. 11 illustrates a cloud computing network in communication with a mesh network of IoT devices (devices 1102) operating as a fog platform in a networked scenario. The mesh network of IoT devices may be termed a fog network 1120, established from a network of devices operating at the Edge of the cloud 1100. To simplify the diagram, not every IoT device 1102 is labeled.

The fog network 1120 may be considered to be a massively interconnected network wherein a number of IoT devices 1102 are in communications with each other, for example, by radio links 1122. The fog network 1120 may establish a horizontal, physical, or virtual resource platform that can be considered to reside between IoT Edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the Edge and the cloud. Thus, references in the present document to the "Edge", "fog", and "cloud" are not necessarily discrete or exclusive of one another.

As an example, the fog network 1120 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1102 are shown in this example, gateways 1104, data aggregators 1126, and sensors 1128, although any combinations of IoT devices 1102 and functionality may be used. The gateways 1104 may be Edge devices that provide communications between the cloud 1100 and the fog network 1120, and may also provide the backend process function for data obtained from sensors 1128, such as motion data, flow data, temperature data, and the like. The data aggregators 1126 may collect data from any number of the sensors 1128, and perform the back end processing function for the analysis. The results, raw data, or both may be passed along to the cloud 1100 through the gateways 1104. The sensors 1128 may be full IoT devices 1102, for example, capable of both collecting data and processing the data. In some cases, the sensors 1128 may be more limited in functionality, for example, collecting the data and allowing the data aggregators 1126 or gateways 1104 to process the data.

Communications from any IoT device 1102 may be passed along a convenient path between any of the IoT devices 1102 to reach the gateways 1104. In these networks, the number of interconnections provide substantial redundancy, allowing communications to be maintained, even with the loss of a number of IoT devices 1102. Further, the use of a mesh network may allow IoT devices 1102 that are very low power or located at a distance from infrastructure to be used, as the range to connect to another IoT device 1102 may be much less than the range to connect to the gateways 1104.

The fog network 1120 provided from these IoT devices 1102 may be presented to devices in the cloud 1100, such as a server 1106, as a single device located at the Edge of the cloud 1100, e.g., a fog network operating as a device or platform. In this example, the alerts coming from the fog platform may be sent without being identified as coming from a specific IoT device 1102 within the fog network 1120. In this fashion, the fog network 1120 may be considered a distributed platform that provides computing and storage resources to perform processing or data-intensive tasks such as data analytics, data aggregation, and machine-learning, among others.

In some examples, the IoT devices 1102 may be configured using an imperative programming style, e.g., with each IoT device 1102 having a specific function and communication partners. However, the IoT devices 1102 forming the fog platform may be configured in a declarative programming style, enabling the IoT devices 1102 to reconfigure their operations and communications, such as to determine needed resources in response to conditions, queries, and device failures. As an example, a query from a user located at a server 1106 about the operations of a subset of equipment monitored by the IoT devices 1102 may result in the fog network 1120 device the IoT devices 1102, such as particular sensors 1128, needed to answer the query. The data from these sensors 1128 may then be aggregated and analyzed by any combination of the sensors 1128, data aggregators 1126, or gateways 1104, before being sent on by the fog network 1120 to the server 1106 to answer the query. In this example, IoT devices 1102 in the fog network 1120 may select the sensors 1128 used based on the query, such as adding data from flow sensors or temperature sensors. Further, if some of the IoT devices 1102 are not operational, other IoT devices 1102 in the fog network 1120 may provide analogous data, if available.

In other examples, the operations and functionality described herein may be embodied by an IoT or Edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 12:
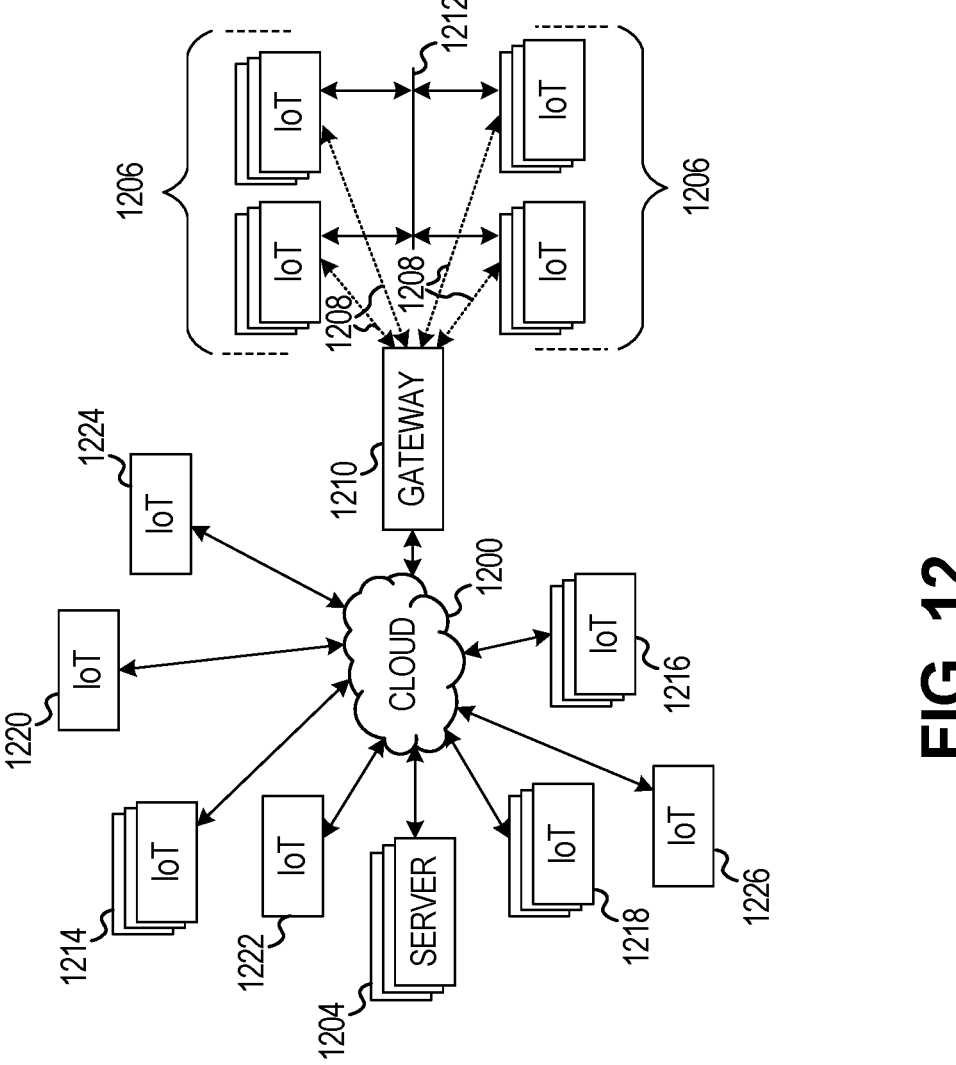
FIG. 12 illustrates a drawing of a cloud computing network, or cloud, in communication with a number of Internet of Things (IoT) devices, according to an example.

FIG. 12 illustrates a drawing of a cloud computing network, or cloud 1200, in communication with a number of Internet of Things (IoT) devices. The cloud 1200 may represent the Internet, or may be a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, and the like. Further, a wired or wireless sub-network 1212 may allow the IoT devices to communicate with each other, such as through a local area network, a wireless local area network, and the like. The IoT devices may use another device, such as a gateway 1210 or 1228 to communicate with remote locations such as the cloud 1200; the IoT devices may also use one or more servers 1230 to facilitate communication with the cloud 1200 or with the gateway 1210. For example, the one or more servers 1230 may operate as an intermediate network node to support a local Edge cloud or fog implementation among a local area network. Further, the gateway 1228 that is depicted may operate in a cloud-to-gateway-to-many Edge devices configuration, such as with the various IoT devices 1214, 1220, 1224 being constrained or dynamic to an assignment and use of resources in the cloud 1200.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT fog device or system (not shown, but depicted in FIG. 11), or a combination therein. The groups of IoT devices may be deployed in various residential, commercial, and industrial settings (including in both private or public environments).

As may be seen from FIG. 12, a large number of IoT devices may be communicating through the cloud 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a fog device or system (e.g., as described above with reference to FIG. 11).

Figure 13:
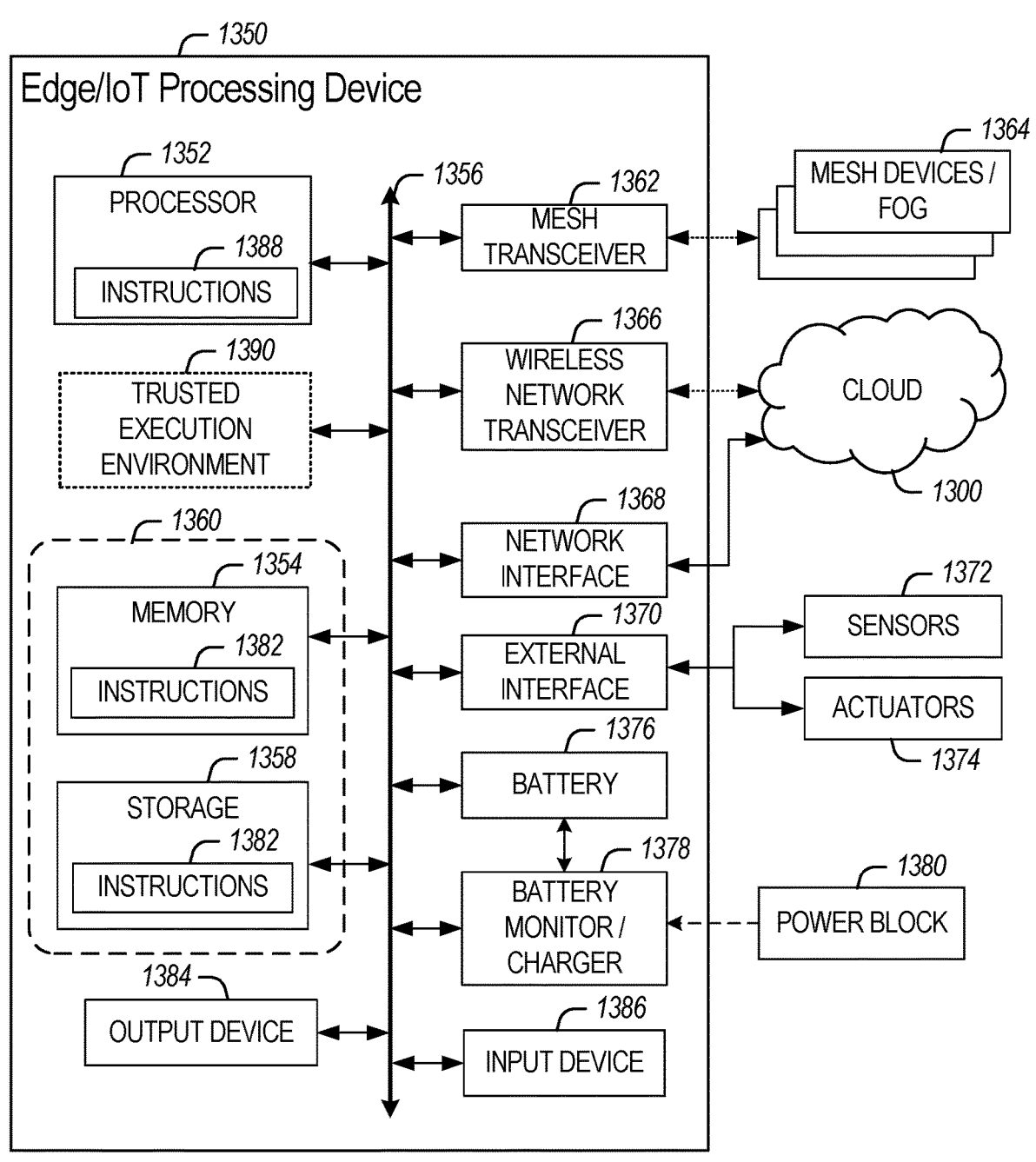
FIG. 13 illustrates a block diagram for an example IoT processing system architecture upon which any one or more of the techniques (e.g., operations, processes, methods, and methodologies) discussed herein may be performed, according to an example.

FIG. 13 is a block diagram of an example of components that may be present in an IoT device 1350 for implementing the techniques described herein. The IoT device 1350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1350, or as components otherwise incorporated within a chassis of a larger system. Additionally, the block diagram of FIG. 13 is intended to depict a high-level view of components of the IoT device 1350. However, some of the components shown may be omitted, additional components may be present, and different arrangement of the components shown may occur in other implementations.

The IoT device 1350 may include processor circuitry in the form of, for example, a processor 1352, which may be a microprocessor, a multi-core processor, a multithreaded processor, an ultra-low voltage processor, an embedded processor, or other known processing elements. The processor 1352 may be a part of a system on a chip (SoC) in which the processor 1352 and other components are formed into a single integrated circuit, or a single package, such as the Edison™ or Galileo™ SoC boards from Intel. As an example, the processor 1352 may include an Intel® Architecture Core™ based processor, such as a Quark™, an Atom™, an i3, an i5, an i7, or an MCU-class processor, or another such processor available from Intel® Corporation, Santa Clara, CA. However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example the storage 1358 may be implemented via a solid state disk drive (SSDD). Other devices that may be used for the storage 1358 include flash memory cards, such as SD cards, microSD cards, xD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 1362, 1366, 1368, or 1370. Accordingly, in various examples, applicable means for communicating (e.g., receiving, transmitting, etc.) may be embodied by such communications circuitry.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at different range. For example, the IoT device 1350 may communicate with close devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1366 may be included to communicate with devices or services in the cloud 1300 via local or wide area network protocols. The wireless network transceiver 1366 may be a LPWA transceiver that follows the IEEE 802.15.4, or IEEE 802.15.4g standards, among others. The IoT device 1350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1362 and 1366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to allow connect to a second network, for example, a NIC 1368 providing communications to the cloud over Ethernet, and a second NIC 1368 providing communications to other devices over another type of network.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the IoT device 1350 to actuators 1374, such as power switches, valve actuators, an audible sound generator, a visual warning device, and the like.

In some optional examples, various input/output (I/O) devices may be present within, or connected to, the IoT device 1350. For example, a display or other output device 1384 may be included to show information, such as sensor readings or actuator position. An input device 1386, such as a touch screen or keypad may be included to accept input. An output device 1386 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1350.

A battery 1376 may power the IoT device 1350, although in examples in which the IoT device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the IoT device 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/ charger 1378 may communicate the information on the battery 1376 to the processor 1352 over the interconnect 1356. The battery monitor/charger 1378 may also include an analog-to-digital (ADC) convertor that allows the processor 1352 to directly monitor the voltage of the battery 1376 or the current flow from the battery 1376. The battery parameters may be used to determine actions that the IoT device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the IoT device 1350. A wireless battery charging circuit, such as an LTC4020 chip from Linear Technologies of Milpitas, CA, among others, may be included in the battery monitor/charger 1378. The specific charging circuits chosen depend on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine readable medium 1360 including code to direct the processor 1352 to perform electronic operations in the IoT device 1350. The processor 1352 may access the non-transitory, machine readable medium 1360 over the interconnect 1356. For instance, the non-transitory, machine readable medium 1360 may be embodied by devices described for the storage 1358 of FIG. 13 or may include specific storage units such as optical disks, flash drives, or any number of other hardware devices. The non-transitory, machine readable medium 1360 may include instructions to direct the processor 1352 to perform a specific sequence or flow of actions, for example, as described with respect to the flowchart(s) and block diagram(s) of operations and functionality depicted above.

Also in a specific example, the instructions 1388 on the processor 1352 (separately, or in combination with the instructions 1388 of the machine readable medium 1360) may configure execution or operation of a trusted execution environment (TEE) 1390. In an example, the TEE 1390 operates as a protected area accessible to the processor 1352 for secure execution of instructions and secure access to data. Various implementations of the TEE 1390, and an accompanying secure area in the processor 1352 or the memory 1354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1350 through the TEE 1390 and the processor 1352.

Figure 14:
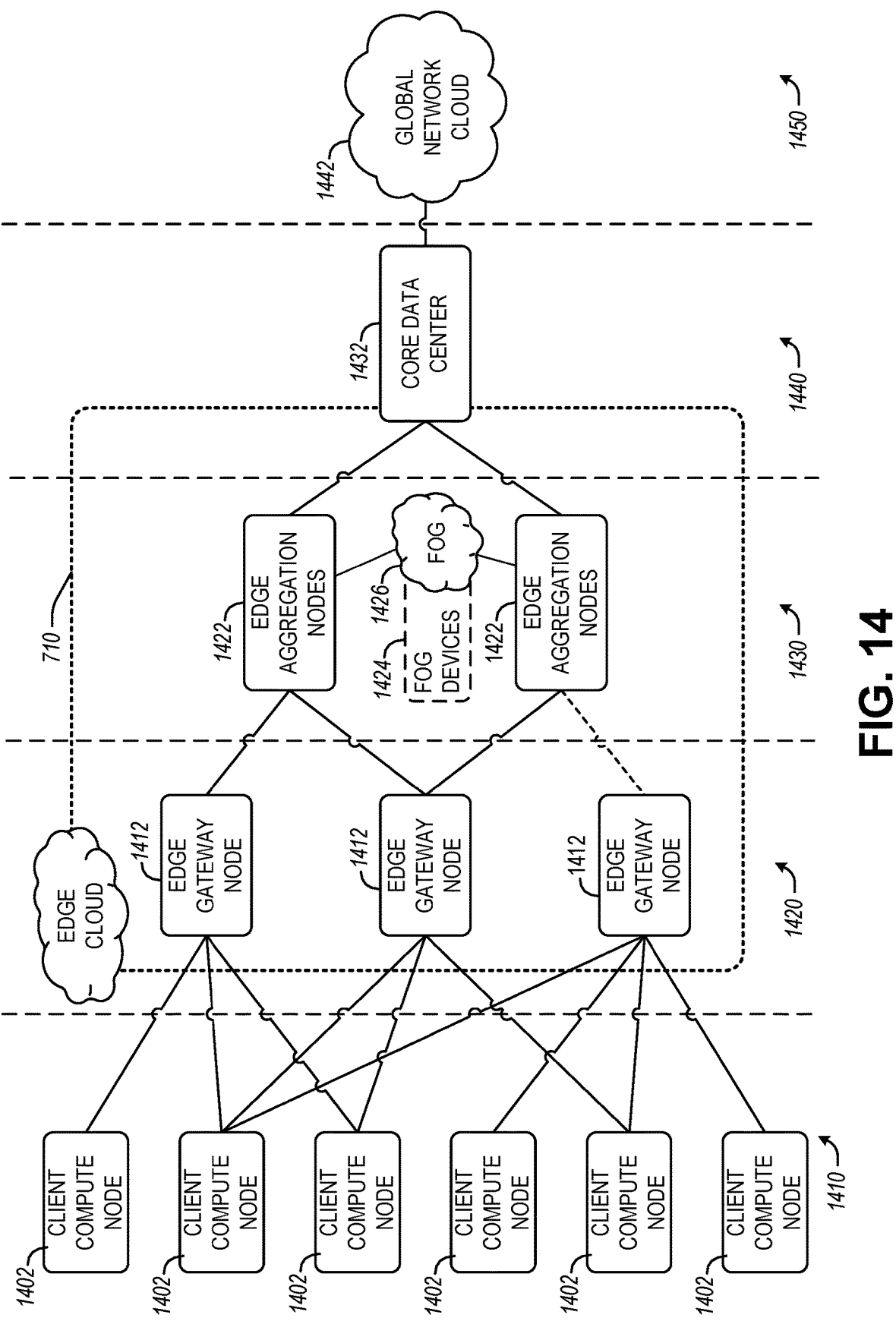
FIG. 14 illustrates an overview of layers of distributed compute deployed among an Edge computing system, according to an example.

At a more generic level, an Edge computing system may be described to encompass any number of deployments operating in an Edge cloud 710, which provide coordination from client and distributed computing devices. FIG. 14 provides a further abstracted overview of layers of distributed compute deployed among an Edge computing environment for purposes of illustration.

FIG. 14 generically depicts an Edge computing system for providing Edge services and applications to multi-stakeholder entities, as distributed among one or more client compute nodes 1402, one or more Edge gateway nodes 1412, one or more Edge aggregation nodes 1422, one or more core data centers 1432, and a global network cloud 1442, as distributed across layers of the network. The implementation of the Edge computing system may be provided at or on behalf of a telecommunication service provider ("telco", or "TSP"), internet-of-things service provider, cloud service provider (CSP), enterprise entity, or any other number of entities.

Each node or device of the Edge computing system is located at a particular layer corresponding to layers 1410, 1420, 1430, 1440, 1450. For example, the client compute nodes 1402 are each located at an endpoint layer 1410, while each of the Edge gateway nodes 1412 are located at an Edge devices layer 1420 (local level) of the Edge computing system. Additionally, each of the Edge aggregation nodes 1422 (and/or fog devices 1424, if arranged or operated with or among a fog networking configuration 1426) are located at a network access layer 1430 (an intermediate level). Fog computing (or "fogging") generally refers to extensions of cloud computing to the Edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with Edge computing as discussed herein; many of the Edge computing aspects discussed herein are applicable to fog networks, fogging, and fog configurations. Further, aspects of the Edge computing systems discussed herein may be configured as a fog, or aspects of a fog may be integrated into an Edge computing architecture.

The core data center 1432 is located at a core network layer 1440 (e.g., a regional or geographically-central level), while the global network cloud 1442 is located at a cloud data center layer 1450 (e.g., a national or global layer). The use of "core" is provided as a term for a centralized network location—deeper in the network—which is accessible by multiple Edge nodes or components; however, a "core" does not necessarily designate the "center" or the deepest location of the network. Accordingly, the core data center 1432 may be located within, at, or near the Edge cloud 710.

Although an illustrative number of client compute nodes 1402, Edge gateway nodes 1412, Edge aggregation nodes 1422, core data centers 1432, global network clouds 1442 are shown in FIG. 14, it should be appreciated that the Edge computing system may include more or fewer devices or systems at each layer. Additionally, as shown in FIG. 14, the number of components of each layer 1410, 1420, 1430, 1440, 1450 generally increases at each lower level (i.e., when moving closer to endpoints). As such, one Edge gateway node 1412 may service multiple client compute nodes 1402, and one Edge aggregation node 1422 may service multiple Edge gateway nodes 1412.

Consistent with the examples provided herein, each client compute node 1402 may be embodied as any type of end point component, device, appliance, or "thing" capable of communicating as a producer or consumer of data. Further, the label "node" or "device" as used in the Edge computing system 1400 does not necessarily mean that such node or device operates in a client or agent/minion/follower role; rather, any of the nodes or devices in the Edge computing system 1400 refer to individual entities, nodes, or subsystems which include discrete or connected hardware or software configurations to facilitate or use the Edge cloud 710.

As such, the Edge cloud 710 is formed from network components and functional features operated by and within the Edge gateway nodes 1412 and the Edge aggregation nodes 1422 of layers 1420, 1430, respectively. The Edge cloud 710 may be embodied as any type of network that provides Edge computing and/or storage resources which are proximately located to radio access network (RAN) capable endpoint devices (e.g., mobile computing devices, IoT devices, smart devices, etc.), which are shown in FIG.

14 as the client compute nodes 1402. In other words, the Edge cloud 710 may be envisioned as an "Edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the Edge cloud 710 may form a portion of or otherwise provide an ingress point into or across a fog networking configuration 1426 (e.g., a network of fog devices 1424, not shown in detail), which may be embodied as a system-level horizontal and distributed architecture that distributes resources and services to perform a specific function. For instance, a coordinated and distributed network of fog devices 1424 may perform computing, storage, control, or networking aspects in the context of an IoT system arrangement. Other networked, aggregated, and distributed functions may exist in the Edge cloud 710 between the cloud data center layer 1450 and the client endpoints (e.g., client compute nodes 1402). Some of these are discussed in the following sections in the context of network functions or service virtualization, including the use of virtual Edges and virtual services which are orchestrated for multiple stakeholders.

The Edge gateway nodes 1412 and the Edge aggregation nodes 1422 cooperate to provide various Edge services and security to the client compute nodes 1402. Furthermore, because each client compute node 1402 may be stationary or mobile, each Edge gateway node 1412 may cooperate with other Edge gateway devices to propagate presently provided Edge services and security as the corresponding client compute node 1402 moves about a region. To do so, each of the Edge gateway nodes 1412 and/or Edge aggregation nodes 1422 may support multiple tenancy and multiple stakeholder configurations, in which services from (or hosted for) multiple service providers and multiple consumers may be supported and coordinated across a single or multiple compute devices.

Computing Devices and Systems

In further examples, any of the compute nodes or devices discussed with reference to the present edge computing systems and environment may be fulfilled based on the components depicted in FIGS. 15A and 15B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 15A:
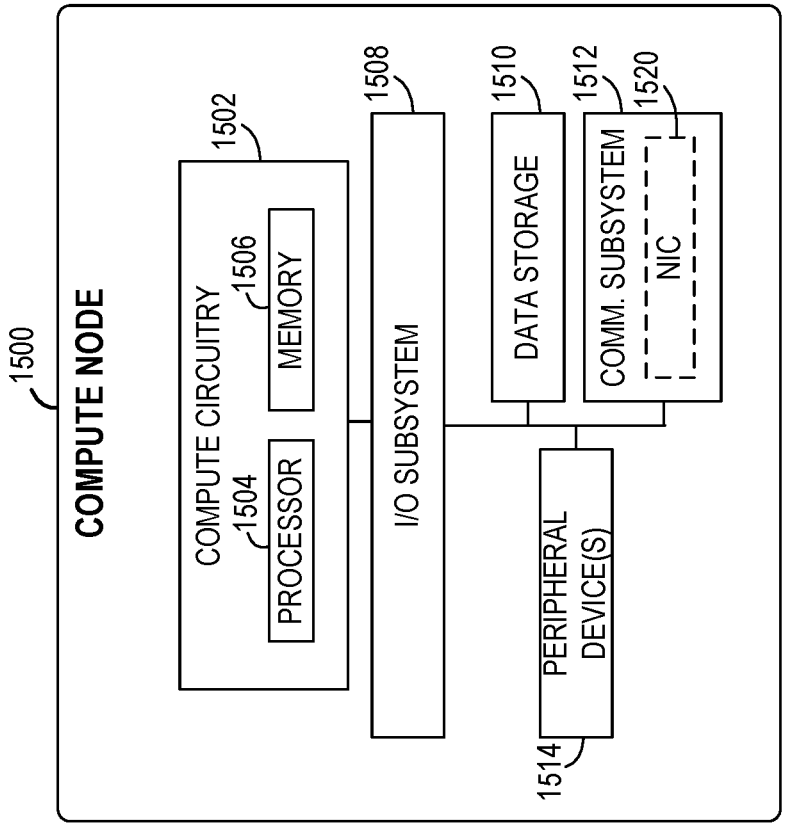
FIG. 15A provides an overview of example components for compute deployed at a compute node in an edge computing system.

In the simplified example depicted in FIG. 15A, an edge compute node 1500 includes a compute engine (also referred to herein as "compute circuitry") 1502, an input/output (I/O) subsystem 1508, data storage 1510, a communication circuitry subsystem 1512, and, optionally, one or more peripheral devices 1514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1500 may be embodied as any type of engine, device, or collection of devices capable of performing various compute functions. In some examples, the compute node 1500 may be embodied as a single device such as an integrated circuit, an embedded system, a field-programmable gate array (FPGA), a system-on-a-chip (SOC), or other integrated system or device. In the illustrative example, the compute node 1500 includes or is embodied as a processor 1504 and a memory 1506. The processor 1504 may be embodied as any type of processor capable of performing the functions described herein (e.g., executing an application). For example, the processor 1504 may be embodied as a multi-core processor(s), a microcontroller, a processing unit, a specialized or special purpose processing unit, or other processor or processing/controlling circuit.

In some examples, the processor 1504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1504 may work in coordination with each other to execute many types of operations and instructions within and on behalf of the compute node 1500.

The memory 1506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1506 may be integrated into the processor 1504.

The memory 1506 may store various software and data used during operation such as one or more applications®, data operated on by the application(s), libraries, and drivers.

The compute circuitry 1502 is communicatively coupled to other components of the compute node 1500 via the I/O subsystem 1508, which may be embodied as circuitry and/or components to facilitate input/output operations with the compute circuitry 1502 (e.g., with the processor 1504 and/or the main memory 1506) and other components of the compute circuitry 1502. For example, the I/O subsystem 1508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1508 may form a portion of a system-on-a-chip (SoC) and be incorporated, along with one or more of the processor 1504, the memory 1506, and other components of the compute circuitry 1502, into the compute circuitry 1502.

The one or more illustrative data storage devices 1510 may be embodied as any type of devices configured for short-term or long-term storage of data such as, for example, memory devices and circuits, memory cards, hard disk drives, solid-state drives, or other data storage devices. Individual data storage devices 1510 may include a system partition that stores data and firmware code for the data storage device 1510. Individual data storage devices 1510 may also include one or more operating system partitions that store data files and executables for operating systems depending on, for example, the type of compute node 1500.

The communication circuitry 1512 may be embodied as any communication circuit, device, or collection thereof, capable of enabling communications over a network between the compute circuitry 1502 and another compute device (e.g., an edge gateway of an implementing edge computing system). The communication circuitry 1512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1512 includes a network interface controller (NIC) 1520, which may also be referred to as a host fabric interface (HFI). The NIC 1520 may be embodied as one or more add-in-boards, daughter cards, network interface cards, controller chips, chipsets, or other devices that may be used by the compute node 1500 to connect with another compute device (e.g., an edge gateway node). In some examples, the NIC 1520 may be embodied as part of a system-on-a-chip (SoC) that includes one or more processors, or included on a multichip package that also contains one or more processors. In some examples, the NIC 1520 may include a local processor (not shown) and/or a local memory (not shown) that are both local to the NIC 1520. In such examples, the local processor of the NIC 1520 may be capable of performing one or more of the functions of the compute circuitry 1502 described herein. Additionally, or alternatively, in such examples, the local memory of the NIC 1520 may be integrated into one or more components of the client compute node at the board level, socket level, chip level, and/or other levels.

Additionally, in some examples, a respective compute node 1500 may include one or more peripheral devices 1514. Such peripheral devices 1514 may include any type of peripheral device found in a compute device or server such as audio input devices, a display, other input/output devices, interface devices, and/or other peripheral devices, depending on the particular type of the compute node 1500. In further examples, the compute node 1500 may be embodied by a respective edge compute node (whether a client, gateway, or aggregation node) in an edge computing system or like forms of appliances, computers, subsystems, circuitry, or other components.

Figure 15B:
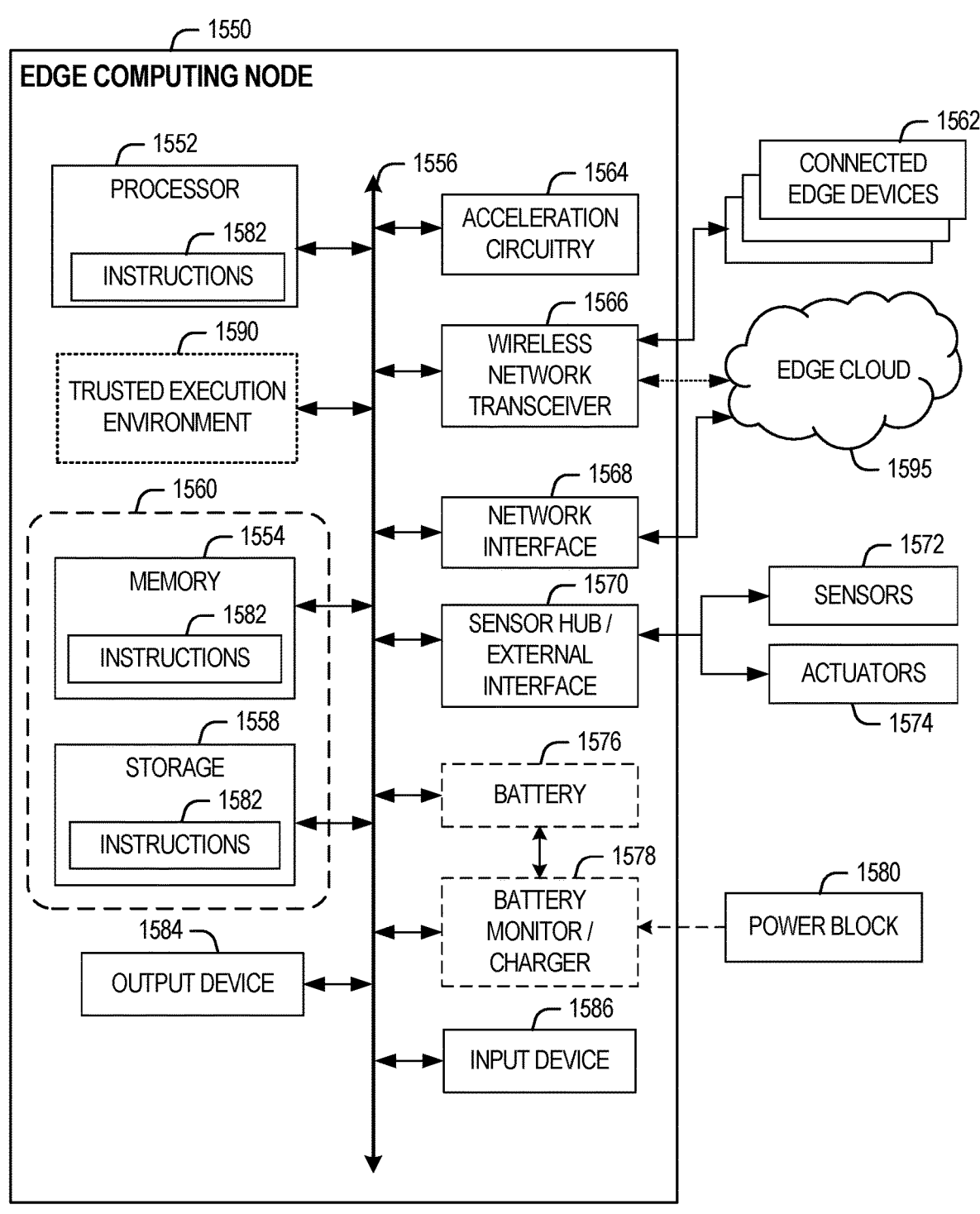
FIG. 15B provides a further overview of example components within a computing device in an edge computing system.

In a more detailed example, FIG. 15B illustrates a block diagram of an example of components that may be present in an edge computing node 1550 for implementing the techniques (e.g., operations, processes, methods, and methodologies) described herein. This edge computing node 1550 provides a closer view of the respective components of node 1500 when implemented as or as part of a computing device (e.g., as a mobile device, a base station, server, gateway, etc.). The edge computing node 1550 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1550, or as components otherwise incorporated within a chassis of a larger system.

The edge computing device 1550 may include processing circuitry in the form of a processor 1552, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1552 may be a part of a system on a chip (SoC) in which the processor 1552 and other components are formed into a single integrated circuit, or a single package, such as the Edison™ or Galileo™ SoC boards from Intel Corporation, Santa Clara, California. As an example, the processor 1552 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1552 and accompanying circuitry may be provided in a single socket form factor, multiple socket form factor, or a variety of other formats, including in limited hardware configurations or configurations that include fewer than all elements shown in FIG. 15B.

The processor 1552 may communicate with a system memory 1554 over an interconnect 1556 (e.g., a bus). Any number of memory devices may be used to provide for a given amount of system memory. As examples, the memory

754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1556 may couple the processor 1552 to a transceiver 1566, for communications with the connected edge devices 1562. The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the edge computing node 1550 may communicate with close devices, e.g., within about 10 meters, using a local transceiver based on Bluetooth Low Energy (BLE), or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in a cloud (e.g., an edge cloud 1595) via local or wide area network protocols. The wireless network transceiver 1566 may be a low-power wide-area (LPWA) transceiver that follows the IEEE 802.15.4, or IEEE 802.15.4g standards, among others. The edge computing node 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1568 may be included to provide a wired communication to nodes of the edge cloud 1595 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, etc.) may be embodied by such communications circuitry.

The edge computing node 1550 may include or be coupled to acceleration circuitry 1564, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1556 may couple the processor 1552 to a sensor hub or external interface 1570 that is used to connect additional devices or subsystems. The devices may include sensors 1572, such as accelerometers, level sensors, flow sensors, optical light sensors, camera sensors, temperature sensors, global navigation system (e.g., GPS) sensors, pressure sensors, barometric pressure sensors, and the like. The hub or interface 1570 further may be used to connect the edge computing node 1550 to actuators 1574, such as power switches, valve actuators, an audible sound generator, a visual warning device, and the like.

In some optional examples, various input/output (I/O) devices may be present within or connected to, the edge computing node 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1550. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the edge computing node 1550, although, in examples in which the edge computing node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the edge computing node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the edge computing node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the edge computing node 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine-readable medium 1560 including code to direct the processor 1552 to perform electronic operations in the edge computing node 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1582 on the processor 1552 (separately, or in combination with the instructions 1582 of the machine readable medium 1560) may configure execution or operation of a trusted execution environment (TEE) 1590. In an example, the TEE 1590 operates as a protected area accessible to the processor 1552 for secure execution of instructions and secure access to data. Various implementations of the TEE 1590, and an accompanying secure area in the processor 1552 or the memory 1554 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1550 through the TEE 1590 and the processor 1552.

Machine-Readable Medium and Distributed Software Instructions

Figure 16:
FIG. 16 illustrates an example software distribution platform to distribute software.
Figure 16:
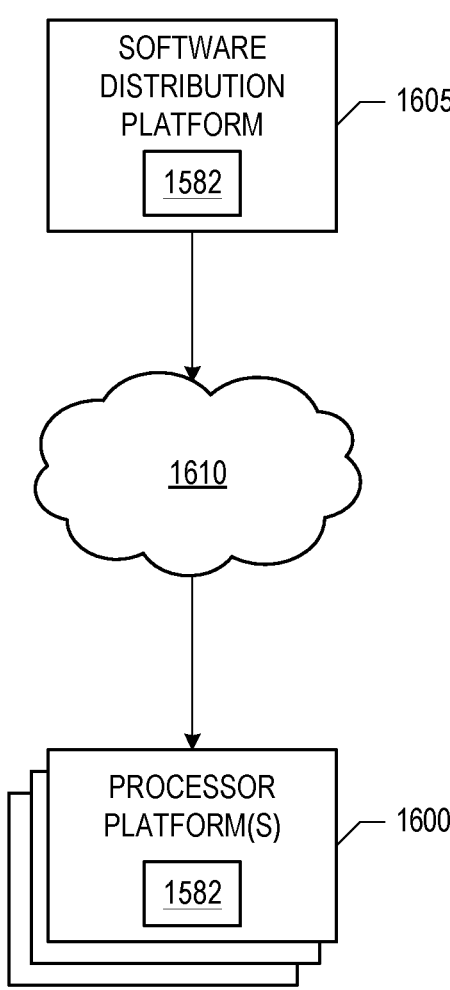

FIG. 16 illustrates an example software distribution platform 1605 to distribute software, such as the example computer readable instructions 1582 of FIG. 15B, to one or more devices, such as example processor platform(s) 1600 and/or example connected edge devices described throughout this disclosure. The example software distribution platform 1605 may be implemented by any computer server, data facility, cloud service, etc., capable of storing and transmitting software to other computing devices (e.g., third parties, example connected edge devices described throughout this disclosure). Example connected edge devices may be customers, clients, managing devices (e.g., servers), third parties (e.g., customers of an entity owning and/or operating the software distribution platform 1605). Example connected edge devices may operate in commercial and/or home automation environments. In some examples, a third party is a developer, a seller, and/or a licensor of software such as the example computer readable instructions 1582 of FIG. 15B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 16, the software distribution platform 1605 includes one or more servers and one or more storage devices. The storage devices store the computer readable instructions 1582, which may implement the computer vision pipeline functionality described throughout this disclosure. The one or more servers of the example software distribution platform 1605 are in communication with a network 1610, which may correspond to any one or more of the Internet and/or any of the example networks described throughout this disclosure. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1582 from the software distribution platform 1605. For example, software comprising the computer readable instructions 1582 may be downloaded to the example processor platform(s) 1600 (e.g., example connected edge devices), which is/are to execute the computer readable instructions 1582 to implement the functionality described throughout this disclosure. In some examples, one or more servers of the software distribution platform 1605 are communicatively connected to one or more security domains and/or security devices through which requests and transmissions of the example computer readable instructions 1582 must pass. In some examples, one or more servers of the software distribution platform 1605 periodically offer, transmit, and/or force updates to the software (e.g., the example computer readable instructions 1582 of FIG. 15B) to ensure improvements, patches, updates, etc. are distributed and applied to the software at the end user devices.

In the illustrated example of FIG. 16, the computer readable instructions 1582 are stored on storage devices of the software distribution platform 1605 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1582 stored in the software distribution platform 1605 are in a first format when transmitted to the example processor platform(s) 1600. In some examples, the first format is an executable binary in which particular types of the processor platform(s) 1600 can execute. However, in some examples, the first format is uncompiled code that requires one or more preparation tasks to transform the first format to a second format to enable execution on the example processor platform(s) 1600. For instance, the receiving processor platform(s) 1600 may need to compile the computer readable instructions 1582 in the first format to generate executable code in a second format that is capable of being executed on the processor platform(s) 1600. In still other examples, the first format is interpreted code that, upon reaching the processor platform(s) 1600, is interpreted by an interpreter to facilitate execution of instructions.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

EXAMPLES

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes an electronic device, comprising: a video-in interface; a video-out interface to communicate with a display device; memory circuitry; and processing circuitry to: receive, via the video-in interface, a first video stream, wherein the first video stream contains uncompressed frames; compress the first video stream, wherein the uncompressed frames of the first video stream are individually compressed into compressed frames; store the compressed frames of the first video stream in a video buffer on the memory circuitry; decode a second video stream, wherein the second video stream contains encoded frames, and wherein the encoded frames are decoded into decoded frames; play the second video stream on the display device, wherein the decoded frames of the second video stream are displayed on the display device via the video-out interface; decompress the first video stream, wherein the compressed frames in the video buffer are individually decompressed into decompressed frames; and play the first video stream on the display device, wherein the decompressed frames of the first video stream are displayed on the display device via the video-out interface.

Example 2 includes the electronic device of Example 1, wherein the processing circuitry comprises: video compression circuitry to compress the first video stream, wherein the video compression circuitry individually compresses the uncompressed frames of the first video stream into the compressed frames; video decompression circuitry to decompress the first video stream, wherein the video decompression circuitry individually decompresses the compressed frames in the video buffer into the decompressed frames; and video decoder circuitry to decode the second video stream, wherein the video decoder circuitry decodes the encoded frames of the second video stream into the decoded frames.

Example 3 includes the electronic device of any of Examples 1-2, wherein the processing circuitry to play the second video stream on the display device and play the first video stream on the display device comprises a display controller to: cause the decoded frames of the second video stream to be displayed on the display device via the video-out interface; and cause the decompressed frames of the first video stream to be displayed on the display device via the video-out interface.

Example 4 includes the electronic device of any of Examples 1-3, wherein the processing circuitry to play the first video stream on the display device is to: before playing the second video stream on the display device: play the first video stream on the display device, wherein the uncompressed frames or the decompressed frames of the first video stream are displayed on the display device via the video-out interface; and pause the first video stream; and after playing the second video stream on the display device: resume playing the first video stream on the display device, wherein the decompressed frames of the first video stream are displayed on the display device via the video-out interface.

Example 5 includes the electronic device of Example 4, wherein the processing circuitry to pause the first video stream comprises video analytics circuitry to: determine, based on analyzing content in the first video stream or the second video stream, to switch from the first video stream to the second video stream, wherein the first video stream is to be paused and the second video stream is to be played on the display device.

Example 6 includes the electronic device of any of Examples 1-5, wherein: the compressed frames are individually compressed based on intra-frame compression; and the encoded frames are encoded based on inter-frame coding.

Example 7 includes the electronic device of any of Examples 1-6, wherein: the memory circuitry comprises a volatile memory and a non-volatile storage device; and the processing circuitry to store the compressed frames of the first video stream in the video buffer on the memory circuitry is to: store the compressed frames in the video buffer on the volatile memory until a memory utilization threshold is exceeded; and store the compressed frames in the video buffer on the non-volatile storage device after the memory utilization threshold is exceeded.

Example 8 includes the electronic device of any of Examples 1-7, further comprising: network interface circuitry to receive the second video stream over a network; or a non-volatile storage device to store the second video stream, wherein the second video stream is read from the non-volatile storage device.

Example 9 includes the electronic device of any of Examples 1-8, wherein: the display device comprises a plurality of display devices, wherein the plurality of display devices are configured as a video wall; and the video-out interface comprises a plurality of video-out interfaces to communicate with the plurality of display devices.

Example 10 includes the electronic device of any of Examples 1-8, wherein the electronic device is: a system-on-a-chip; a discrete graphics card; a field-programmable gate array; an edge computing appliance; a media player; a video game console; a projector; a digital display; a digital sign; an interactive flat panel display; or a video wall controller.

Example 11 includes at least one non-transitory machine-readable storage medium having instructions stored thereon, wherein the instructions, when executed on processing circuitry of an electronic device, cause the processing circuitry to: receive, via a video-in interface, a first video stream, wherein the first video stream contains uncompressed frames; compress the first video stream, wherein the uncompressed frames of the first video stream are individually compressed into compressed frames; store the compressed frames of the first video stream in a video buffer; decode a second video stream, wherein the second video stream contains encoded frames, and wherein the encoded frames are decoded into decoded frames; play the second video stream on a display device, wherein the decoded frames of the second video stream are displayed on the display device via a video-out interface; decompress the first video stream, wherein the compressed frames in the video buffer are individually decompressed into decompressed frames; and play the first video stream on the display device, wherein the decompressed frames of the first video stream are displayed on the display device via the video-out interface.

Example 12 includes the storage medium of Example 11, wherein: the processing circuitry comprises video compression circuitry, video decompression circuitry, and video decoder circuitry; the instructions that cause the processing circuitry to compress the first video stream cause the processing circuitry to: compress the first video stream using the video compression circuitry, wherein the video compression circuitry is to individually compress the uncompressed frames of the first video stream into the compressed frames; the instructions that cause the processing circuitry to decompress the first video stream cause the processing circuitry to: decompress the first video stream using the video decompression circuitry, wherein the video decompression circuitry is to individually decompress the compressed frames in the video buffer into the decompressed frames; and the instructions that cause the processing circuitry to decode the second video stream cause the processing circuitry to: decode the second video stream using the video decoder circuitry, wherein the video decoder circuitry is to decode the encoded frames of the second video stream into the decoded frames.

Example 13 includes the storage medium of any of Examples 11-12, wherein the instructions that cause the processing circuitry to play the first video stream on the display device cause the processing circuitry to: before playing the second video stream on the display device: play the first video stream on the display device, wherein the uncompressed frames or the decompressed frames of the first video stream are displayed on the display device via the video-out interface; and pause the first video stream; and after playing the second video stream on the display device: resume playing the first video stream on the display device, wherein the decompressed frames of the first video stream are displayed on the display device via the video-out interface.

Example 14 includes the storage medium of Example 13, wherein the instructions that cause the processing circuitry to pause the first video stream cause the processing circuitry to: determine, based on analyzing content in the first video stream or the second video stream, to switch from the first video stream to the second video stream, wherein the first video stream is to be paused and the second video stream is to be played on the display device.

Example 15 includes the storage medium of any of Examples 11-14, wherein: the compressed frames are compressed based on intra-frame compression; and the encoded frames are encoded based on inter-frame coding.

Example 16 includes the storage medium of any of Examples 11-15, wherein the instructions that cause the processing circuitry to store the compressed frames of the first video stream in the video buffer cause the processing circuitry to: store the compressed frames in the video buffer on a volatile memory until a memory utilization threshold is exceeded; and store the compressed frames in the video buffer on a non-volatile storage device after the memory utilization threshold is exceeded.

Example 17 includes the storage medium of any of Examples 11-16, wherein the instructions cause the processing circuitry to: receive, via network interface circuitry, the second video stream over a network; or read the second video stream from a non-volatile storage device.

Example 18 includes the storage medium of any of Examples 11-17, wherein: the first video stream contains live video content; and the second video stream contains an advertisement.

Example 19 includes the storage medium of any of Examples 11-17, wherein: the first video stream contains teacher content; and the second video stream contains student content.

Example 20 includes a method, comprising: receiving, via a video-in interface, a first video stream, wherein the first video stream contains uncompressed frames; compressing the first video stream, wherein the uncompressed frames of the first video stream are individually compressed into compressed frames; storing the compressed frames of the first video stream in a video buffer; decoding a second video stream, wherein the second video stream contains encoded frames, and wherein the encoded frames are decoded into decoded frames; playing the second video stream on a display device, wherein the decoded frames of the second video stream are displayed on the display device via a video-out interface; decompressing the first video stream, wherein the compressed frames in the video buffer are individually decompressed into decompressed frames; and playing the first video stream on the display device, wherein the decompressed frames of the first video stream are displayed on the display device via the video-out interface.

Example 21 includes the method of Example 20, wherein playing the first video stream on the display device comprises: before playing the second video stream on the display device: playing the first video stream on the display device, wherein the uncompressed frames or the decompressed frames of the first video stream are displayed on the display device via the video-out interface; and pausing the first video stream; and after playing the second video stream on the display device: resuming playing the first video stream on the display device, wherein the decompressed frames of the first video stream are displayed on the display device via the video-out interface.

Example 22 includes the method of Example 21, wherein pausing the first video stream comprises: determining, based on analyzing content in the first video stream or the second video stream, to switch from the first video stream to the second video stream, wherein the first video stream is to be paused and the second video stream is to be played on the display device.

Example 23 includes a system, comprising: a video-in interface; one or more video-out interfaces; one or more display devices; memory circuitry; and processing circuitry to: receive, via the video-in interface, a first video stream, wherein the first video stream contains uncompressed frames; compress the first video stream, wherein the uncompressed frames of the first video stream are independently compressed into compressed frames; store the compressed frames of the first video stream in a video buffer on the memory circuitry; decode a second video stream, wherein the second video stream contains encoded frames, and wherein the encoded frames are decoded into decoded frames; play the second video stream on the one or more display devices, wherein the decoded frames of the second video stream are displayed on the one or more display devices via the one or more video-out interfaces; decompress the first video stream, wherein the compressed frames in the video buffer are individually decompressed into decompressed frames; and play the first video stream on the one or more display devices, wherein the decompressed frames of the first video stream are displayed on the one or more display devices via the one or more video-out interfaces.

Example 24 includes the system of Example 23, wherein: the one or more display devices comprises a plurality of display devices, wherein the plurality of display devices are configured as a video wall; and the one or more video-out interfaces comprises a plurality of video-out interfaces to communicate with the plurality of display devices.

Example 25 includes the system of Example 23, wherein the system is: a digital display; a digital sign; an interactive flat panel display; or a video wall.

While the concepts of the present disclosure are susceptible to various modifications and alternative forms, specific embodiments thereof have been shown by way of example in the drawings and are described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

What is claimed is:

1. An electronic device, comprising:
a video-in interface;
a video-out interface to communicate with a display device;
memory circuitry; and
processing circuitry to:
receive, via the video-in interface, a first video stream, wherein the first video stream contains uncompressed frames;
compress the first video stream using inline compression, wherein the uncompressed frames of the first video stream are individually and independently compressed into compressed frames;
store the compressed frames of the first video stream in a video buffer on the memory circuitry;
decode a second video stream using a video codec, wherein the second video stream contains encoded frames, and wherein the encoded frames are decoded into decoded frames;
play the second video stream on the display device, wherein the decoded frames of the second video stream are displayed on the display device via the video-out interface;
decompress the first video stream using inline decompression, wherein the compressed frames in the video buffer are individually and independently decompressed into decompressed frames; and
play the first video stream on the display device, wherein the decompressed frames of the first video stream are displayed on the display device via the video-out interface.

2. The electronic device of claim 1, wherein the processing circuitry comprises:
video compression circuitry to compress the first video stream using inline compression, wherein the video compression circuitry individually and independently compresses the uncompressed frames of the first video stream into the compressed frames;
video decompression circuitry to decompress the first video stream using inline decompression, wherein the video decompression circuitry individually and independently decompresses the compressed frames in the video buffer into the decompressed frames; and video decoder circuitry to decode the second video stream using the video codec, wherein the video decoder circuitry decodes the encoded frames of the second video stream into the decoded frames.

3. The electronic device of claim 1, wherein the processing circuitry to play the second video stream on the display device and play the first video stream on the display device comprises a display controller to:
cause the decoded frames of the second video stream to be displayed on the display device via the video-out interface; and
cause the decompressed frames of the first video stream to be displayed on the display device via the video-out interface.

4. The electronic device of claim 1, wherein the processing circuitry to play the first video stream on the display device is to:
before playing the second video stream on the display device:
play the first video stream on the display device, wherein the uncompressed frames or the decompressed frames of the first video stream are displayed on the display device via the video-out interface; and
pause the first video stream; and
after playing the second video stream on the display device:
resume playing the first video stream on the display device, wherein the decompressed frames of the first video stream are displayed on the display device via the video-out interface.

5. The electronic device of claim 1, wherein:
the compressed frames are individually and independently compressed based on intra-frame compression; and
the encoded frames are encoded based on inter-frame coding.

6. The electronic device of claim 1, wherein:
the memory circuitry comprises a volatile memory and a non-volatile storage device; and
the processing circuitry to store the compressed frames of the first video stream in the video buffer on the memory circuitry is to:
store the compressed frames in the video buffer on the volatile memory until a memory utilization threshold is exceeded; and
store the compressed frames in the video buffer on the non-volatile storage device after the memory utilization threshold is exceeded.

7. The electronic device of claim 1, further comprising:
network interface circuitry to receive the second video stream over a network; or
a non-volatile storage device to store the second video stream, wherein the second video stream is read from the non-volatile storage device.

8. The electronic device of claim 1, wherein:
the display device comprises a plurality of display devices, wherein the plurality of display devices are configured as a video wall; and
the video-out interface comprises a plurality of video-out interfaces to communicate with the plurality of display devices.

9. The electronic device of claim 1, wherein the electronic device is:
a system-on-a-chip;
a discrete graphics card;
a field-programmable gate array;
an edge computing appliance;

a media player;

a video game console;

a projector;

a digital display;

a digital sign;

an interactive flat panel display; or a video wall controller.

10. The electronic device of claim 4, wherein the processing circuitry to pause the first video stream comprises video analytics circuitry to:

determine, based on analyzing content in the first video stream or the second video stream, to switch from the first video stream to the second video stream, wherein the first video stream is to be paused and the second video stream is to be played on the display device.

11. At least one non-transitory machine-readable storage medium having instructions stored thereon, wherein the instructions, when executed on processing circuitry of an electronic device, cause the processing circuitry to:

receive, via a video-in interface, a first video stream, wherein the first video stream contains uncompressed frames;

compress the first video stream using inline compression, wherein the uncompressed frames of the first video stream are individually and independently compressed into compressed frames;

store the compressed frames of the first video stream in a video buffer;

decode a second video stream using a video codec, wherein the second video stream contains encoded frames, and wherein the encoded frames are decoded into decoded frames;

play the second video stream on a display device, wherein the decoded frames of the second video stream are displayed on the display device via a video-out interface;

decompress the first video stream using inline decompression, wherein the compressed frames in the video buffer are individually and independently decompressed into decompressed frames; and play the first video stream on the display device, wherein the decompressed frames of the first video stream are displayed on the display device via the video-out interface.

12. The storage medium of claim 11, wherein:

the processing circuitry comprises video compression circuitry, video decompression circuitry, and video decoder circuitry;

the instructions that cause the processing circuitry to compress the first video stream cause the processing circuitry to:

compress the first video stream using the video compression circuitry, wherein the video compression circuitry is to individually and independently compress the uncompressed frames of the first video stream into the compressed frames;

the instructions that cause the processing circuitry to decompress the first video stream cause the processing circuitry to:

decompress the first video stream using the video decompression circuitry, wherein the video decompression circuitry is to individually and independently decompress the compressed frames in the video buffer into the decompressed frames; and the instructions that cause the processing circuitry to decode the second video stream cause the processing circuitry to:

decode the second video stream using the video decoder circuitry, wherein the video decoder circuitry is to decode the encoded frames of the second video stream into the decoded frames.

13. The storage medium of claim 11, wherein the instructions that cause the processing circuitry to play the first video stream on the display device cause the processing circuitry to:

before playing the second video stream on the display device:

play the first video stream on the display device, wherein the uncompressed frames or the decompressed frames of the first video stream are displayed on the display device via the video-out interface; and pause the first video stream; and after playing the second video stream on the display device:

resume playing the first video stream on the display device, wherein the decompressed frames of the first video stream are displayed on the display device via the video-out interface.

14. The storage medium of claim 11, wherein:

the compressed frames are compressed based on intra-frame compression; and the encoded frames are encoded based on inter-frame coding.

15. The storage medium of claim 11, wherein the instructions that cause the processing circuitry to store the compressed frames of the first video stream in the video buffer cause the processing circuitry to:

store the compressed frames in the video buffer on a volatile memory until a memory utilization threshold is exceeded; and store the compressed frames in the video buffer on a non-volatile storage device after the memory utilization threshold is exceeded.

16. The storage medium of claim 11, wherein the instructions further cause the processing circuitry to:

receive, via network interface circuitry, the second video stream over a network; or read the second video stream from a non-volatile storage device.

17. The storage medium of claim 11, wherein:

the first video stream contains live video content; and the second video stream contains an advertisement.

18. The storage medium of claim 11, wherein:

the first video stream contains teacher content; and the second video stream contains student content.

19. The storage medium of claim 13, wherein the instructions that cause the processing circuitry to pause the first video stream cause the processing circuitry to:

determine, based on analyzing content in the first video stream or the second video stream, to switch from the first video stream to the second video stream, wherein the first video stream is to be paused and the second video stream is to be played on the display device.

20. A method, comprising:

receiving, via a video-in interface, a first video stream, wherein the first video stream contains uncompressed frames;

compressing the first video stream using inline compression, wherein the uncompressed frames of the first video stream are individually and independently compressed into compressed frames;

storing the compressed frames of the first video stream in a video buffer;

decoding a second video stream using a video codec, wherein the second video stream contains encoded frames, and wherein the encoded frames are decoded into decoded frames;

playing the second video stream on a display device, wherein the decoded frames of the second video stream are displayed on the display device via a video-out interface;

decompressing the first video stream using inline decompression, wherein the compressed frames in the video buffer are individually and independently decompressed into decompressed frames; and playing the first video stream on the display device, wherein the decompressed frames of the first video stream are displayed on the display device via the video-out interface.

21. The method of claim 20, wherein playing the first video stream on the display device comprises:

before playing the second video stream on the display device:

playing the first video stream on the display device, wherein the uncompressed frames or the decompressed frames of the first video stream are displayed on the display device via the video-out interface; and pausing the first video stream; and after playing the second video stream on the display device:

resuming playing the first video stream on the display device, wherein the decompressed frames of the first video stream are displayed on the display device via the video-out interface.

22. The method of claim 21, wherein pausing the first video stream comprises:

determining, based on analyzing content in the first video stream or the second video stream, to switch from the first video stream to the second video stream, wherein the first video stream is to be paused and the second video stream is to be played on the display device.

23. A system, comprising:

a video-in interface;

one or more video-out interfaces;

one or more display devices;

memory circuitry; and processing circuitry to:

receive, via the video-in interface, a first video stream, wherein the first video stream contains uncompressed frames;

compress the first video stream using inline compression, wherein the uncompressed frames of the first video stream are individually and independently compressed into compressed frames;

store the compressed frames of the first video stream in a video buffer on the memory circuitry;

decode a second video stream using a video codec, wherein the second video stream contains encoded frames, and wherein the encoded frames are decoded into decoded frames;

play the second video stream on the one or more display devices, wherein the decoded frames of the second video stream are displayed on the one or more display devices via the one or more video-out interfaces;

decompress the first video stream using inline decompression, wherein the compressed frames in the video buffer are individually and independently decompressed into decompressed frames; and play the first video stream on the one or more display devices, wherein the decompressed frames of the first video stream are displayed on the one or more display devices via the one or more video-out interfaces.

24. The system of claim 23, wherein:

the one or more display devices comprises a plurality of display devices, wherein the plurality of display devices are configured as a video wall; and the one or more video-out interfaces comprises a plurality of video-out interfaces to communicate with the plurality of display devices.

25. The system of claim 23, wherein the system is:

a digital display;

a digital sign;

an interactive flat panel display; or a video wall.

* * * * *